(12) United States Patent
Conti

(10) Patent No.: US 10,751,963 B2
(45) Date of Patent: Aug. 25, 2020

(54) METHOD FOR MANAGING A CARCASS STRUCTURE BUILDING LINE, PROCESS AND PLANT FOR BUILDING TYRE CARCASS STRUCTURES

(71) Applicant: PIRELLI TYRE S.P.A., Milan (IT)

(72) Inventor: Davide Conti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 310 days.

(21) Appl. No.: 15/533,932

(22) PCT Filed: Nov. 24, 2015

(86) PCT No.: PCT/IB2015/059067
§ 371 (c)(1),
(2) Date: Jun. 7, 2017

(87) PCT Pub. No.: WO2016/097905
PCT Pub. Date: Jun. 23, 2016

(65) Prior Publication Data
US 2018/0169982 A1 Jun. 21, 2018

(30) Foreign Application Priority Data
Dec. 15, 2014 (IT) .............................. MI2014A2144

(51) Int. Cl.
*B29D 30/00* (2006.01)
*B29D 30/20* (2006.01)
*B29D 30/24* (2006.01)

(52) U.S. Cl.
CPC ....... *B29D 30/005* (2013.01); *B29D 30/0016* (2013.01); *B29D 30/20* (2013.01);
(Continued)

(58) Field of Classification Search
CPC .. B29D 30/0016; B29D 30/005; B29D 30/10; B29D 30/20; B29D 30/2607;
(Continued)

(56) References Cited

U.S. PATENT DOCUMENTS

2003/0056878 A1* 3/2003 Lemaire ............... B29D 30/005
156/110.1
2003/0170336 A1 9/2003 Caretta et al.
(Continued)

FOREIGN PATENT DOCUMENTS

EP 2 387 500 A1 11/2011
EP 2 576 195 A1 4/2013
(Continued)

OTHER PUBLICATIONS

Pinovskij Mikhail, SU-765007-A1, machine translation. (Year: 1980).*
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A method for managing a carcass structure building line, a plant and a process for building tyre carcass structures, wherein the plant includes a carcass structure building line provided with a plurality of stations including an unloading station and n building stations. A group of forming drums being processed includes m forming drums being processed defining a first size of carcass structure being processed. Three groups of entering forming drums include respective entering forming drums, defining a second size of carcass structure being processed. A pair of support elements being processed includes a first and a second support element being processed and three pairs of entering support elements respectively include a first and a second entering support
(Continued)

element. The invention also relates to a method for managing a carcass structure building line.

16 Claims, 15 Drawing Sheets

(52) U.S. Cl.
CPC .......... *B29D 30/244* (2013.01); *B29D 30/246* (2013.01); *B29D 2030/0038* (2013.01); *B29D 2030/202* (2013.01)

(58) Field of Classification Search
CPC .... B29D 2030/0022; B29D 2030/0038; B29D 2030/202; B29D 2030/206; B29D 2030/246; B29D 30/244; B29D 30/246
USPC .......................................... 156/396
See application file for complete search history.

(56) References Cited

U.S. PATENT DOCUMENTS

| | | | |
|---|---|---|---|
| 2004/0238102 A1* | 12/2004 | Girard ................ | B29D 30/0016 156/111 |
| 2008/0190562 A1* | 8/2008 | Winkler ............... | B29D 30/005 156/396 |
| 2011/0168322 A1* | 7/2011 | Mariani ............... | B29D 30/005 156/111 |
| 2011/0290403 A1 | 12/2011 | D'ambrosio et al. | |
| 2012/0138213 A1* | 6/2012 | Marchini ............. | B29D 30/005 156/110.1 |
| 2013/0078058 A1 | 3/2013 | Marchini et al. | |
| 2014/0166189 A1* | 6/2014 | Currie ................ | B29D 30/0016 156/111 |
| 2014/0374007 A1 | 12/2014 | Portinari et al. | |
| 2015/0020953 A1 | 1/2015 | Portinari et al. | |
| 2015/0290889 A1 | 10/2015 | Portinari et al. | |

FOREIGN PATENT DOCUMENTS

| | | |
|---|---|---|
| RU | 1810294 A1 | 4/1993 |
| RU | 2085389 C1 | 7/1997 |
| RU | 2481192 C2 | 5/2013 |
| SU | 765007 A1 * | 9/1980 |
| WO | WO 2010/070374 A1 | 6/2010 |
| WO | WO 01/89818 | 11/2011 |
| WO | WO 2011/148283 A1 | 12/2011 |
| WO | WO 2013/093791 A1 | 6/2013 |
| WO | WO 2013/093818 A1 | 6/2013 |

OTHER PUBLICATIONS

International Search Report form the European Patent Office in corresponding International Application No. PCT/IB2015/059067 dated Mar. 29, 2016.
Written Opinion of the International Searching Authority from the European Patent Office in corresponding International Application No. PCT/IB2015/059067, dated Mar. 29, 2016.
Official Decision to Grant in Russian counterpart application No. 2017124007 from the Federal Service for Intellectual Property (ROSPATENT), dated Mar. 3, 2019, (21 pages).
English translation of Official Decision to Grant in Russian counterpart application No. 2017124007 from the Federal Service for Intellectual Property (ROSPATENT), dated Mar. 3, 2019, (12 pages).
Search Report in Russian counterpart application No. 2017124007 from the Federal Service for Intellectual Property (ROSPATENT), dated Mar. 3, 2019 (2 pages).
English translation of Search Report in Russian counterpart application No. 2017124007 from the Federal Service for Intellectual Property (ROSPATENT), dated Mar. 3, 2019 (2 pages).
Communication from EPO about EP application No. 11724460.8, which became EP 2 576 195 A1, dated Mar. 13, 2013 (one page).
Communication from EPO about EP application No. 08875780.2, which became EP 2 387 500 A1, dated Oct. 26, 2011 (one page).
Office Action and Search Report from the Brazilian Patent Office in counterpart Brazilian Application No. BR112017007854, dated Feb. 7, 2020.

* cited by examiner

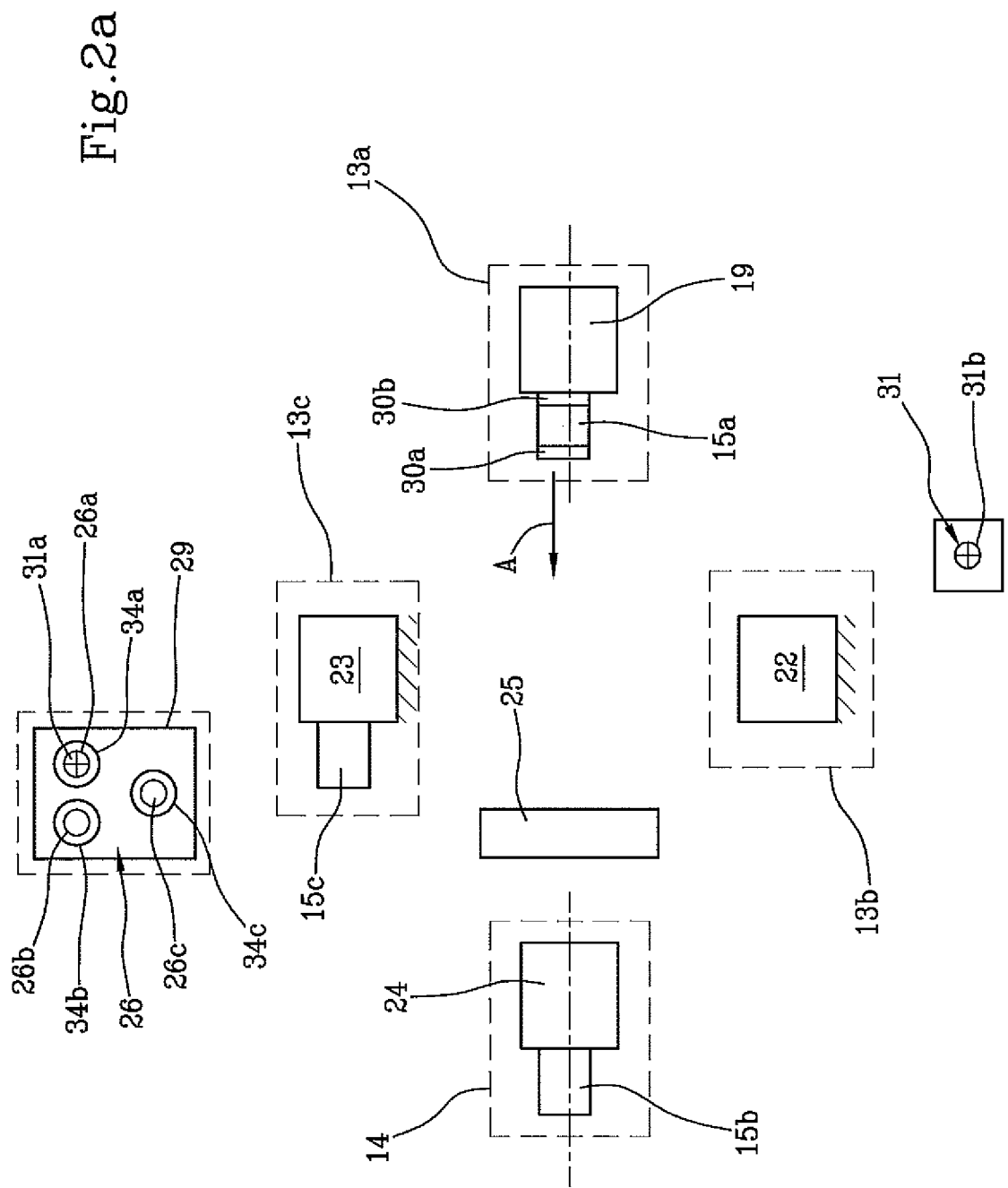

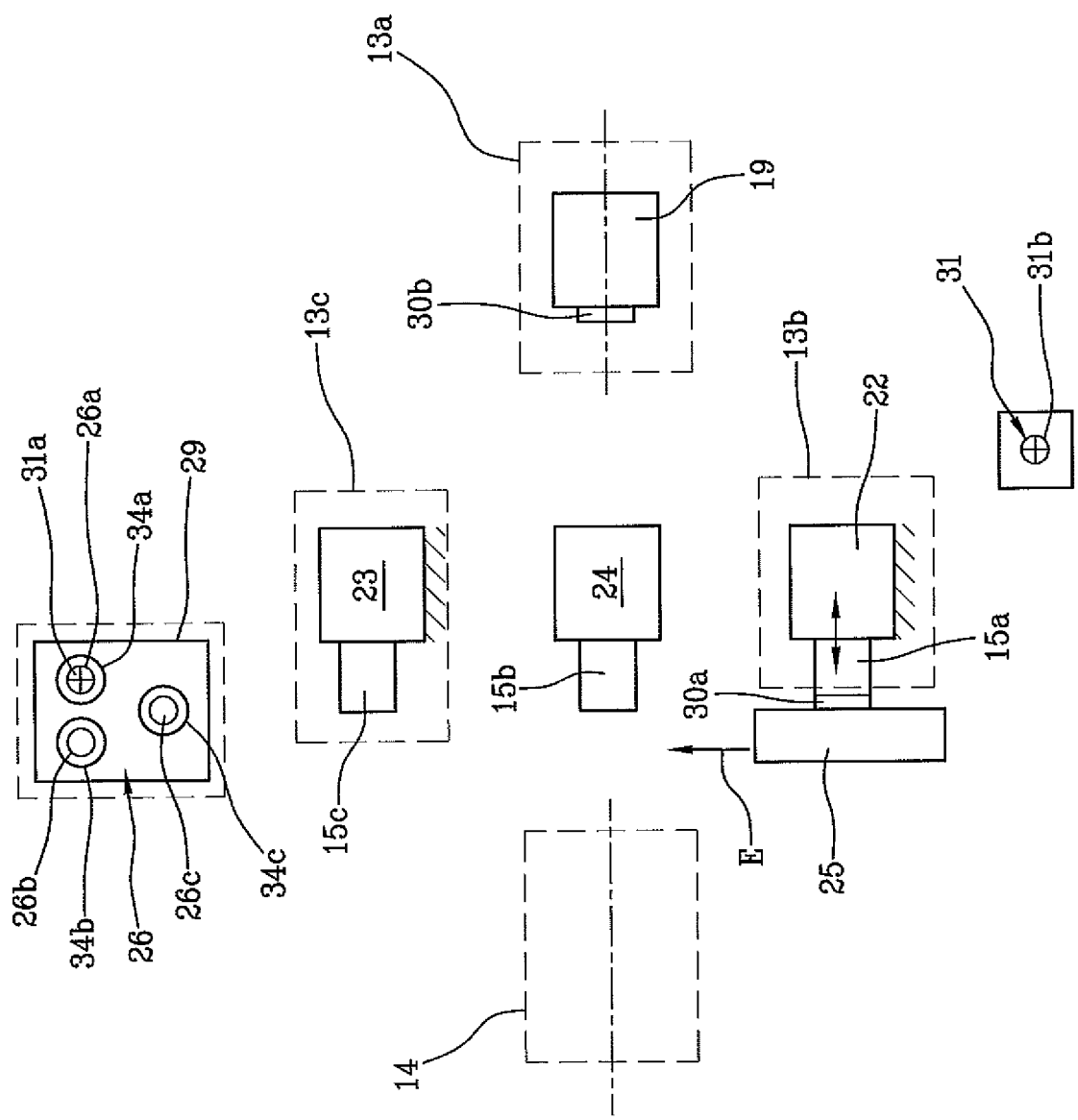

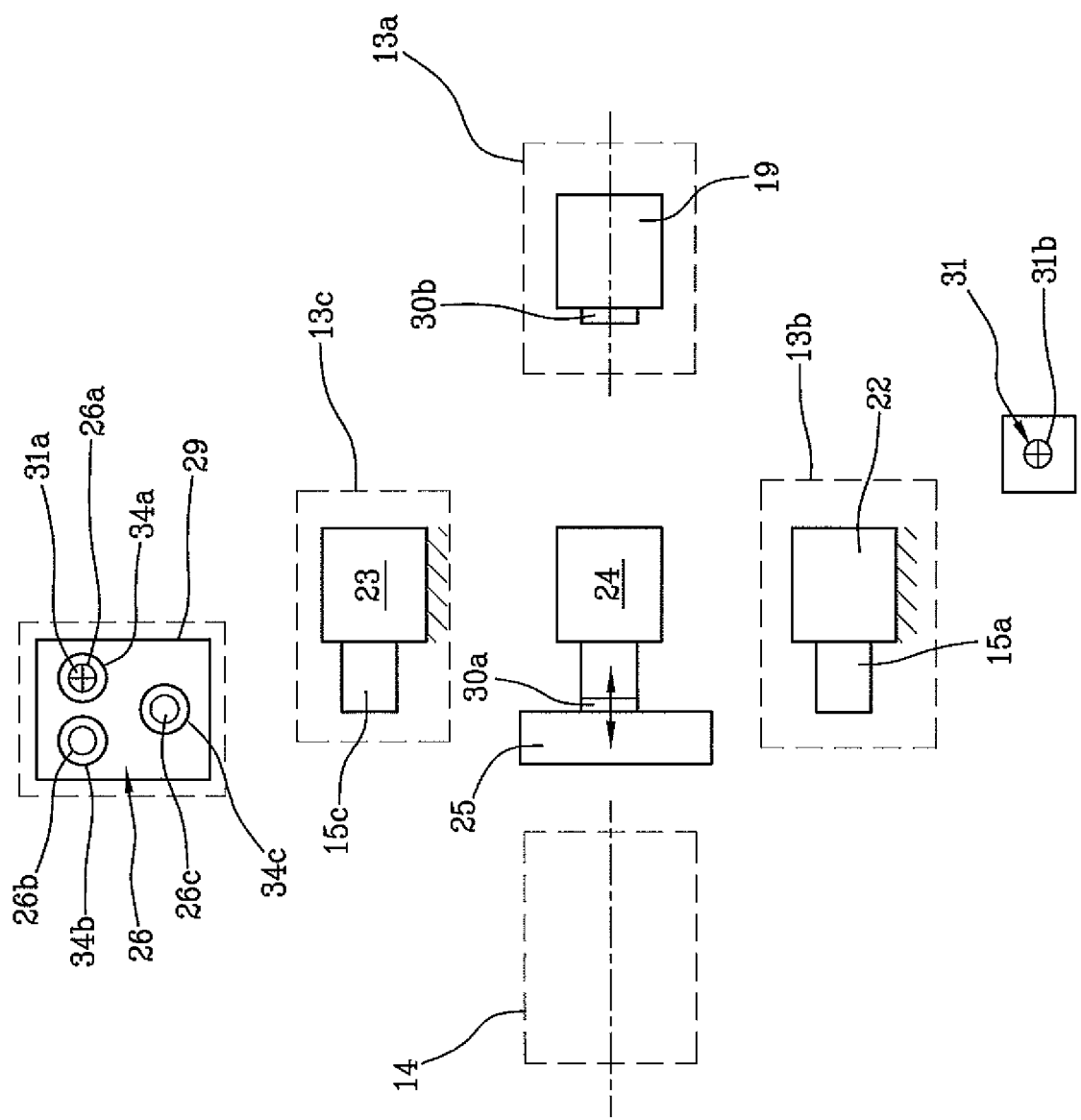

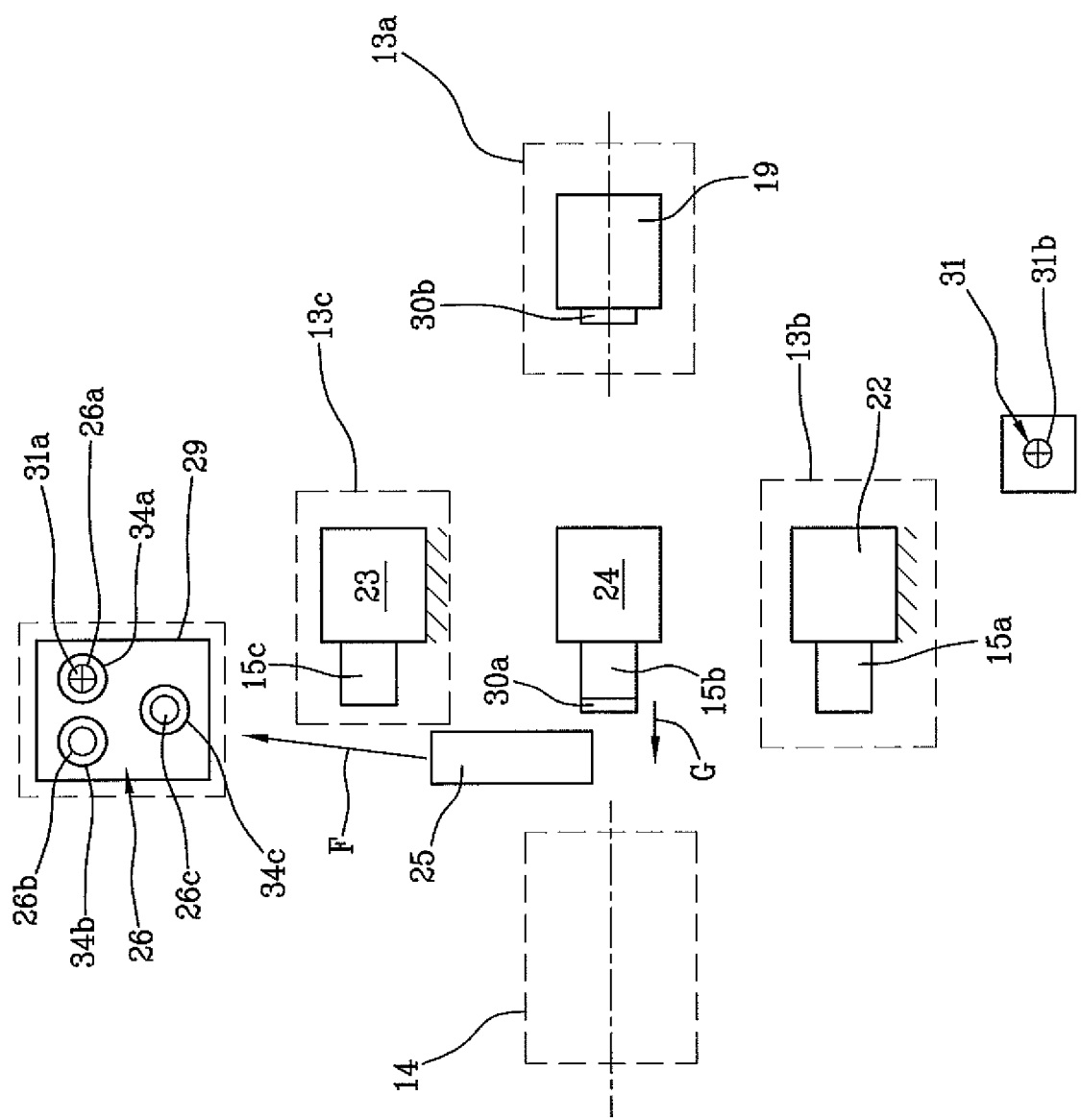

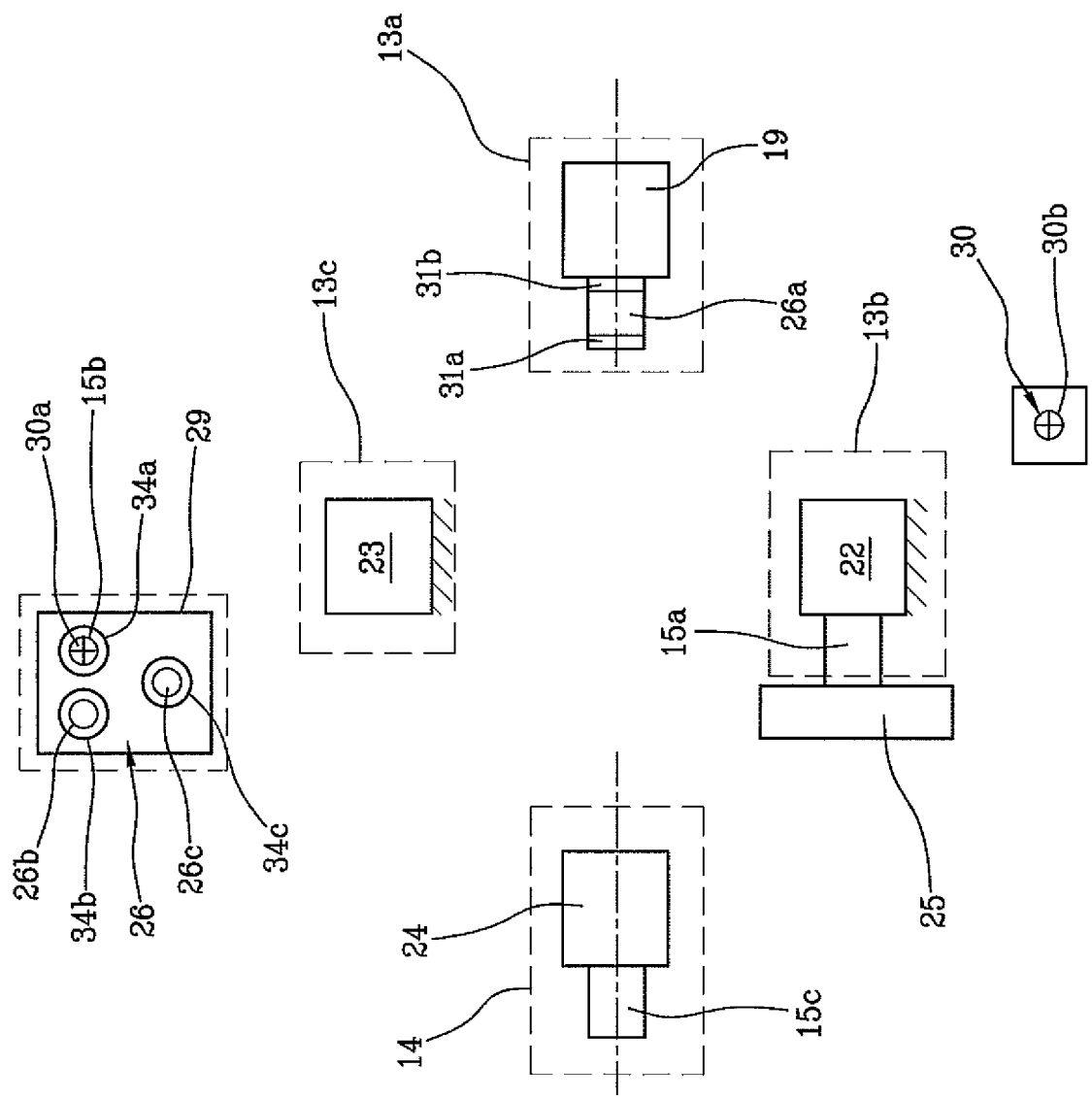

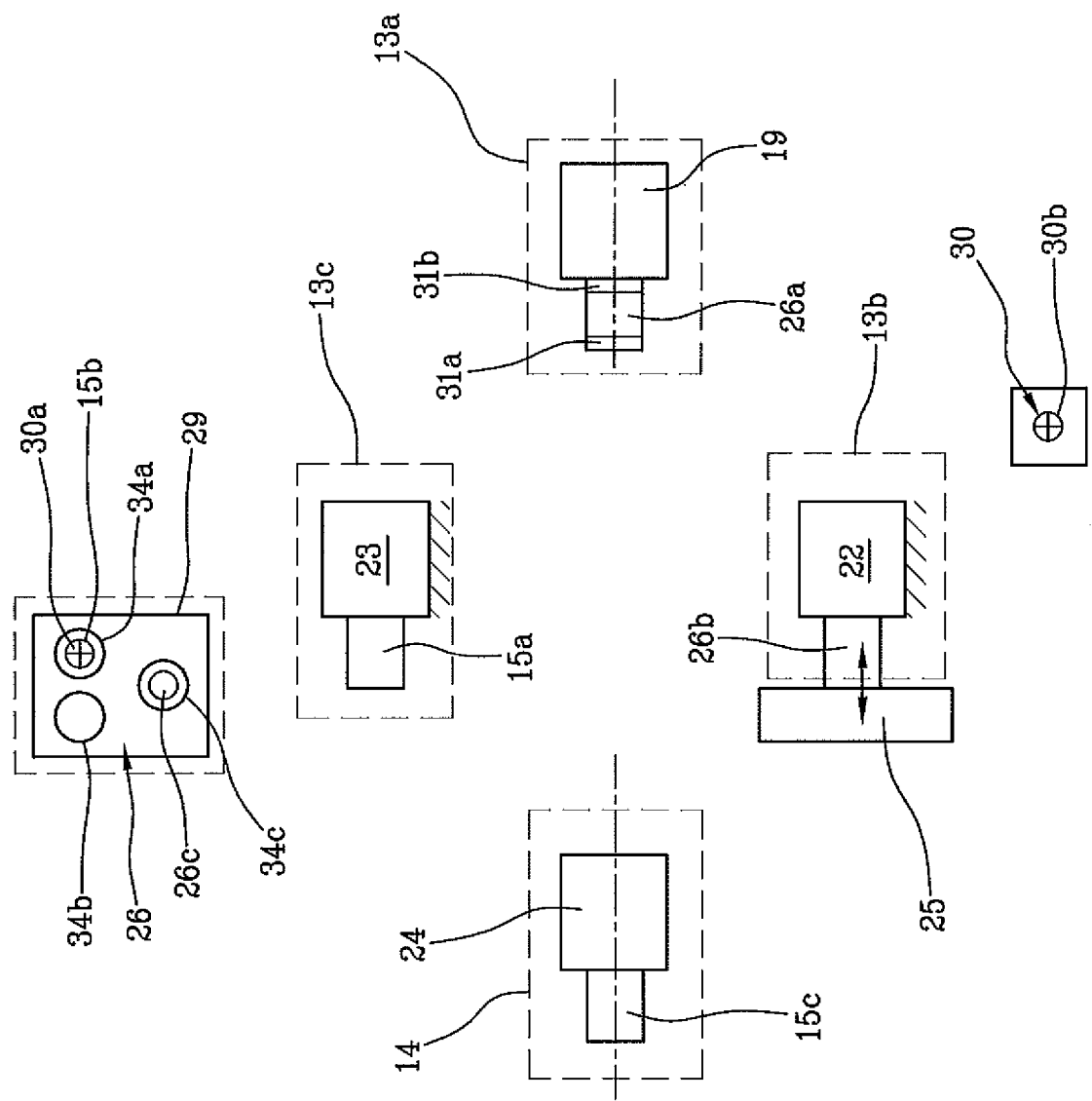

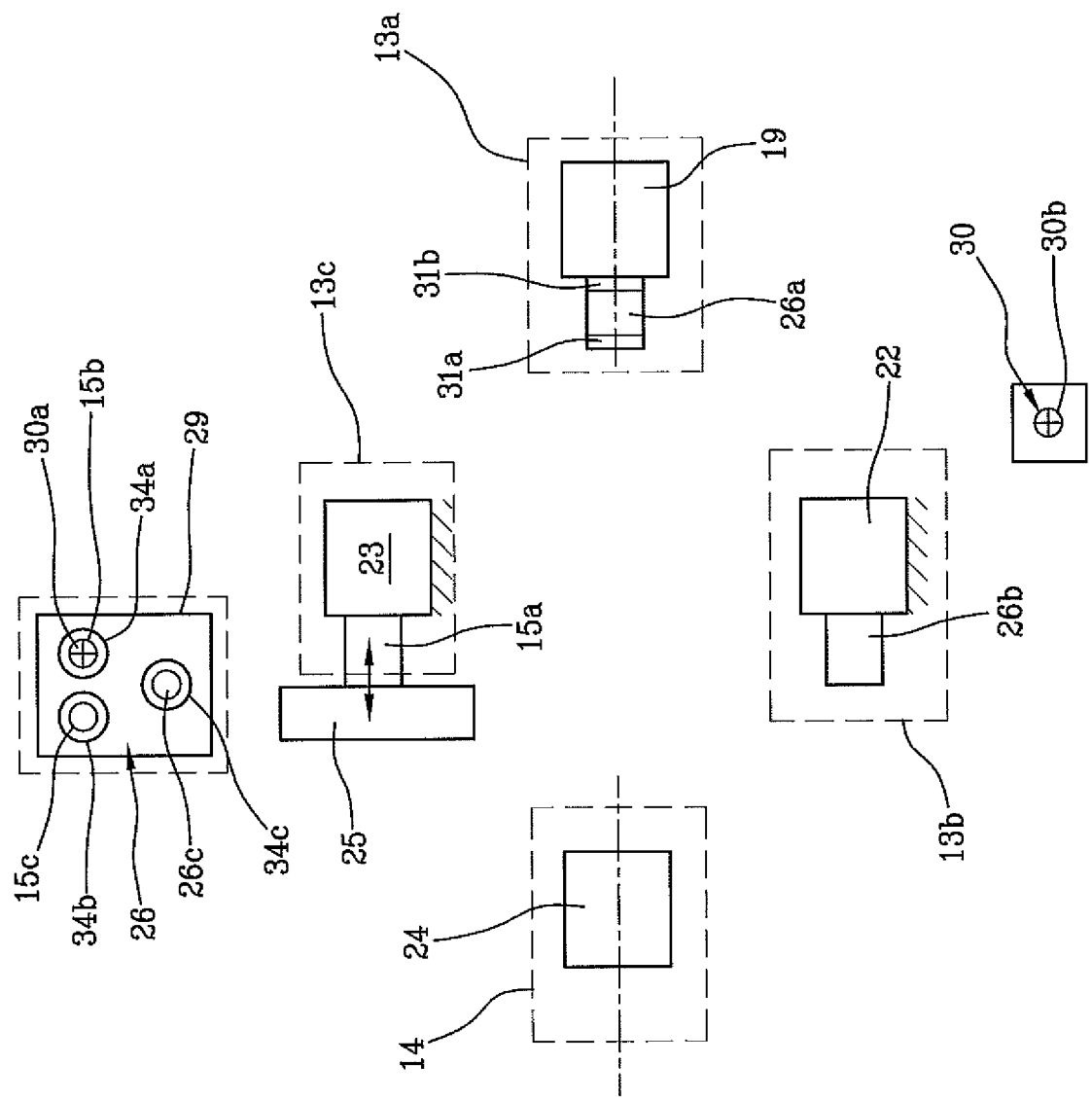
Fig. 2ℓ

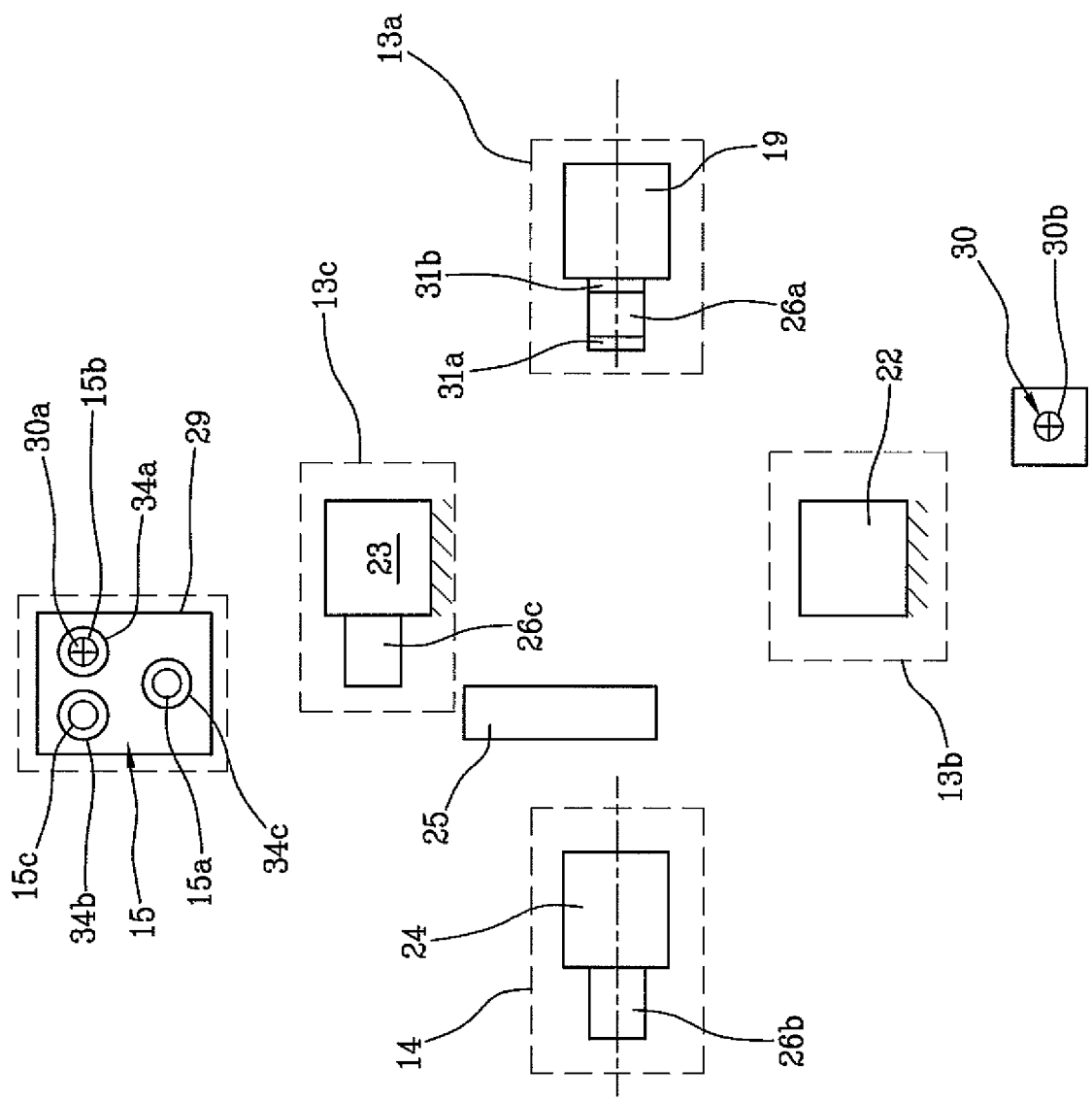

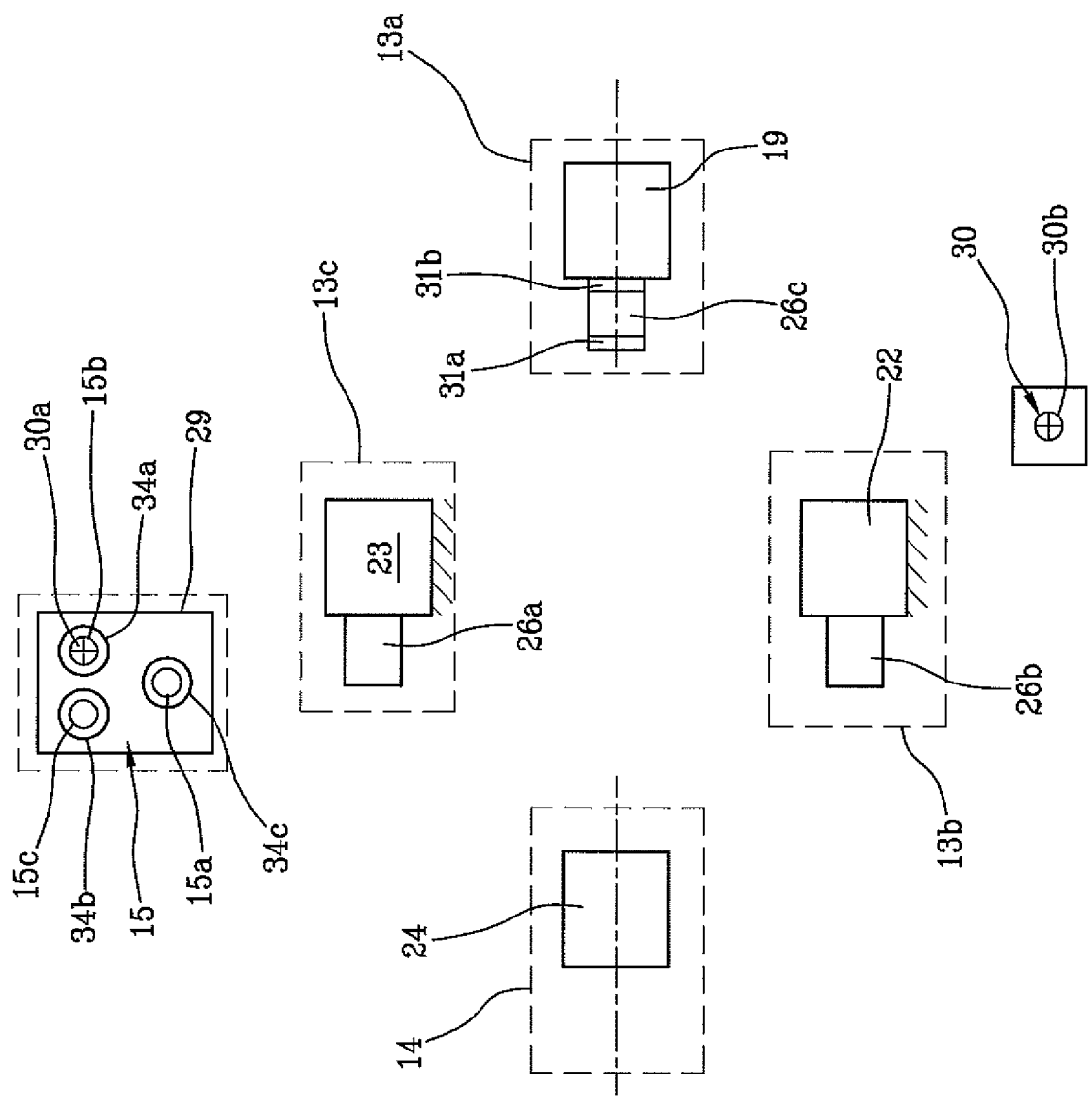

METHOD FOR MANAGING A CARCASS STRUCTURE BUILDING LINE, PROCESS AND PLANT FOR BUILDING TYRE CARCASS STRUCTURES

CROSS REFERENCE TO RELATED APPLICATIONS

This application is a national phase application based on PCT/IB2015/059067, filed Nov. 24, 2015, which claims the priority of Italian Patent Application No. MI2014A002144, filed Dec. 15, 2014, the content of each application being incorporated herein by reference.

BACKGROUND OF THE INVENTION

Field of the Invention

The object of the present invention is a method for managing a carcass structure building line, a process and a plant for building tyre carcass structures.

Description of the Related Art

A tyre for vehicle wheels generally comprises a carcass structure comprising at least one carcass ply having respectively opposite end flaps engaged with respective anchoring annular structures, generally termed "bead cores", integrated in the zones normally identified with the term "beads", having an inner diameter substantially corresponding to a so-called "fitting diameter" of the tyre on a respective mounting rim.

The carcass structure is associated with a belt structure which can comprise one or more belt layers, radially superimposed with respect to each other and with respect to the carcass ply, having textile or metallic reinforcement cords with crossed orientation and/or substantially parallel to the circumferential extension direction of the tyre (zero-degree layer). In radially external position with respect to the belt structure, a tread band is applied, it too made of elastomeric material like other constituent semi-finished products of the tyre.

Respective sidewalls made of elastomeric material are also applied in axially external position on the lateral surfaces of the carcass structure, each extended from one of the lateral edges of the tread band to the respective anchoring annular structure to the beads. In the tyres of "tubeless" type, an air-impermeable covering layer, normally termed "liner", covers the internal surfaces of the tyre.

Following the building of the green tyre actuated by means of assembly of respective components, a moulding and vulcanisation treatment is generally executed aimed to determine the structural stabilisation of the tyre by means of cross-linking of the elastomeric compositions as well as impart thereon, if requested, a desired tread design and possible distinctive graphic marks at the sidewalls of the tyre.

With the expression "elastomeric material" it is intended to indicate a composition comprising at least one elastomeric polymer and at least one reinforcement filler. Preferably, such composition also comprises additives such as a cross-linking agent and/or a plasticizer. Due to the presence of the cross-linking agent, by means of heating such material can be cross-linked, so as to form the final manufactured product.

With the term "building station" it is intended a zone of a building plant comprising one or more building devices.

With the term "building device" it is intended a device adapted to build at least one portion of the carcass structure, for example by supplying on a forming drum one or more semi-finished products, or adapted to complete a processing on the carcass structure being processed, for example the formation of the beads or rolling.

With the term "carcass structure being processed" it is intended one or more portions of a carcass structure during building in a building line, or the completed carcass structure during unloading from a building line.

With the term "unloading station" for unloading the built carcass structure, it is intended a station configured for dissociating the built carcass structure from the relative forming drum in order to make it available for assembly with a relative crown structure.

With the term "sequentially and cyclically" it is intended that the forming drums are moved one after the other, and except for a size change cycle, are brought back to the starting station in order to start a new building cycle.

With the term "size" employed relative to the forming drums, to support elements, and to carcass structures, it is intended at least the set formed by the geometric characteristics. Preferably such characteristics comprise at least the fitting measure, still more preferably at least the measure of the fitting and of the positioning (width along the rotation axis).

With the term "building cycle", it is intended the sequential and cyclical movement between a plurality of building stations and an unloading station for at least one forming drum in order to make a carcass structure.

With the term "forming drums being processed" it is intended the drums defining a specific tyre size and moved according to the same sequence and mode during a building cycle.

With the term "starting station", it is intended the station in which the building occurs of the first portion of the carcass structure being processed on the forming drum, e.g. of the first semi-finished product(s) on the forming drum.

With the term "entering forming drums", it is intended the drums defining a specific tyre size different from that of the forming drums being processed and which are on hold outside the building line or which have been introduced in the building line in an intermediate situation in which the building cycle has not yet started.

With the term "intermediate portion of the carcass structure" it is intended at least one component of the carcass structure (such as for example complex, liner, under-liner, anti-abrasive elongated elements, carcass ply, bead cores, filler of the bead cores, sidewall inserts, reinforcement inserts, at least one sidewalls portion, etc.) or a portion thereof.

With the term "first and second support element being processed" it is intended a pair of auxiliary axially external support elements of a forming drum being processed.

With the term "first and a second entering support element" it is intended a pair of auxiliary axially external support elements of the entering forming drum.

With the term "size change cycle" it is intended a movement cycle of the forming drums in which at least the change of the forming drums being processed is requested, more preferably the change of the forming drums being processed and of the pair of support elements being processed.

With the term "last forming drum being processed" it is intended the forming drum being processed which will be removed last from the building line during a size change cycle or which was the last to start the building cycle before a size change cycle.

With the term "first entering forming drum" it is intended the entering forming drum which is first introduced in the building line during a size change cycle.

With the term "at" used with reference to the stations of the building line, it is intended within the aforesaid station or in a transport device (e.g. a shuttle) belonging to said station.

In the document WO 2013/093791, the building is described of one intermediate portion at a time of the carcass structure on a respective forming drum within an intermediate forming line. The forming drum with the intermediate portion of the carcass structure is made available at a first transfer station. The intermediate portion of the carcass structure is completed through n completion stations with n≥1 and then transferred for the subsequent assembly with the crown structure to a second transfer station. In an operative moment in which the first transfer station is occupied by a forming drum coming from the intermediate forming line or intended for the intermediate forming line, from one to n stations selected from among the n completion stations and the second transfer station are occupied by respective forming drums.

SUMMARY OF THE INVENTION

The Applicant has observed that the plants of the type illustrated in WO 2013/093791, while allowing wide flexibility for adapting and modifying the building cycles, have long adaptation times, in particular of the intermediate forming line, in case of a size change cycle.

Indeed, due to the flexibility of such plants, the size change cycle is not limited to the substitution of the size of the forming drum but it can also involve different compounds and/or different semi-finished products. Even only changing the size of the forming drum, it is necessary to gradually proceed with the arrangement of the new semi-finished products, since the nominal sizes/characteristics thereof might not exactly correspond with the actual sizes/characteristics, requiring a series of adaptations in starting phase.

The Applicant has also observed that in the plants of the type illustrated in WO 2013/093791, the final building phase of a specific tyre size is slowed down in order to balance the first phase (building of the carcass structure) with the second phase (building of the crown structure).

Finally, the Applicant has observed that in the abovementioned plants, the size change cycle is achieved manually, overloading the operator with numerous activities during the passage from one size to another.

In such scope, the Applicant has proposed to increase the flexibility of the plants for producing tyres without increasing the cycle time, in particular in the presence of a size change cycle.

In particular, the Applicant has perceived the importance of automating the size change cycle, preventing further slowdowns from occurring.

The Applicant has then observed that by following the same cycle both in the building and in the size change, there are the following alternatives: sequentially introducing all the entering forming drums in the building line, thus generating an empty cycle at the end of which it is necessary to wait for the plant to come to normal operating conditions, or introducing only one entering forming drum and placing the plant at normal operating conditions, however having to wait further for the introduction of the remaining entering forming drums.

The Applicant has then perceived that by modifying the size change cycle with respect to the building cycle, it is not only possible to automate the size change cycle but also to use it for placing the plant in normal operating conditions, without lengthening the cycle time.

The Applicant has finally found that by providing for a size change cycle—wherein, in at least one operative moment, at least one building station different from the starting station comprises an entering forming drum dissociated from the carcass structure being processed—allows terminating the size change cycle in the time necessary for placing the plant in normal operating conditions and at the same time balances the first phase and the second phase by exploiting the slowdowns, without increasing them, at the end of a size building.

More specifically, according to a first aspect, the present invention relates to a method for managing a carcass structure building line comprising a plurality of stations including an unloading station for unloading a built carcass structure and n building stations, each comprising one or more building devices adapted to form a carcass structure being processed.

Preferably, provision is made for selecting one between a building cycle and a size change cycle.

Preferably, the building cycle comprises sequentially and cyclically moving between the n building stations and the unloading station m forming drums being processed, with $2 \leq m \leq n$.

Preferably, at any one operative moment of said building cycle, only the unloading station and a starting station of the n building stations can comprise a forming drum being processed dissociated from the carcass structure being processed.

Preferably, the size change cycle comprises substituting, one at a time, the forming drums being processed with m entering forming drums by using a movement sequence among the building stations that is at least partially different from that provided in the building cycle.

Preferably, in at least one operative moment of the size change cycle at least one building station different from the starting station comprises an entering forming drum dissociated from the carcass structure being processed.

In accordance with a different aspect, the present invention relates to a process for building tyre carcass structures.

Preferably, provision is made for executing a building cycle for building a carcass structure on a forming drum being processed in a carcass structure building line comprising a plurality of stations including an unloading station of the built carcass structure and n building stations, each comprising one or more building devices adapted to form a carcass structure being processed.

Preferably, said building cycle is repeated for m forming drums being processed, in which $2 \leq m \leq n$, which simultaneously occupy the building line leaving at least one station free between the unloading station and the n building stations.

Preferably, provision is made for a size change cycle that comprises one or more from among the following actions:
transferring a last forming drum being processed associated with the relative carcass structure being processed from the starting station to the next building station during said building cycle,
introducing, in said starting station, a first of m entering forming drums,
while maintaining said first of said entering forming drums at the starting station, sequentially introducing the remaining entering forming drums in the building line and sequentially removing the forming drums being processed from the building line.

In accordance with a further aspect, the present invention relates to a plant for building tyre carcass structures.

Preferably, provision is made for a carcass structure building line.

Preferably, said building line comprises a plurality of stations including an unloading station and n building stations, each comprising one or more building devices adapted to form a carcass structure being processed.

Preferably, provision is made for a group of forming drums being processed comprising m forming drums being processed, with $2 \le m \le n$, defining a first size of carcass structure being processed.

Preferably, provision is made for at least one group of entering forming drums comprising m entering forming drums, defining a second size of carcass structure being processed.

Preferably, provision is made for a pair of support elements being processed comprising a first and a second support element being processed, suitable for said first size of carcass structure being processed.

Preferably, provision is made for at least one pair of entering support elements comprising a first and a second entering support element, suitable for said second size of carcass structure being processed.

Preferably, provision is made for a control unit programmed for one or more between the following actions:
transferring a last forming drum being processed associated with the relative carcass structure being processed from the starting station to the next building station according to a building cycle,
introducing, in said starting station, a first of m entering forming drums, while maintaining said first of said entering forming drums at the starting station, sequentially introducing the remaining entering forming drums in the building line and sequentially removing the forming drums being processed from the building line.

The Applicant deems that such aspects allow attaining an optimal automation of the size change cycle, relieving the operator in order to make him immediately available to place the plant in normal operating conditions. In other words, due to a size change cycle different from the building cycle, it is possible to reconcile the need for automation with that of exploiting the time and human resources normally necessary for the size change cycle in a manner so as to place the plant in normal operating conditions without considerably lengthening the cycle time, maintaining the balance between the first phase and the second phase.

The present invention, in at least one of the aforesaid aspects, can have at least one of the following preferred characteristics, taken separately or in combination with the others.

Preferably, said size change cycle comprises introducing each entering forming drum in said building line at a station different from those in which the remaining entering forming drums are introduced.

Preferably, said size change cycle comprises substituting a first and second support element being processed respectively with a first and a second entering support element, said size change cycle also comprising associating said first entering support element with one of the m entering forming drums.

In this manner, it is possible to eliminate the need of specific hold position for the first support element.

Preferably, said size change cycle comprises substituting said second support element being processed with said second entering support element at one of the building stations and introducing, in the building line, said first entering support element associated with the respective entering forming drum at the same building station.

In this manner, at least the first support element can be substituted in an automated manner and simultaneously with the respective entering forming drum.

Preferably, said second support element being processed is substituted with said second entering support element at the starting station.

In this manner, the substitution of the first support element is not constrained with that of the second support element. The second support element can be manually substituted.

Preferably, said size change cycle comprises dissociating said first support element being processed from a last forming drum being processed associated with a carcass structure being processed, associating said first support element being processed with a first forming drum being processed in order to place them on hold in the unloading station and remove said first forming drum being processed associated with the relative first support element being processed from the building line starting from the unloading station.

In this manner, the size change cycle is not slowed down.

Preferably, said size change cycle comprises:
removing, from said starting station, a last forming drum being processed associated with the relative carcass structure being processed,
introducing, in said starting station, a first of said entering forming drums, while maintaining said first of said entering forming drums at the starting station, sequentially introducing the remaining entering forming drums in the building line and sequentially removing the forming drums being processed from the building line.

Preferably, said size change cycle comprises driving the building device(s) of the starting station simultaneously with sequential introduction of the remaining entering forming drums.

The first of the entering forming drums can remain in the starting station and the operator—not having to carry out manual operations of the size change cycle—can start the building of the new carcass structure size ahead of time, operating the suitable and necessary adaptations while the size change cycle continues.

Preferably, said size change cycle comprises transferring said first of said entering forming drums from the starting station to the next station, according to the building cycle, when all the entering forming drums have been introduced in the building line.

In this manner, it is possible to terminate the size change cycle without affecting the cycle time.

Preferably, removing, from said starting station, a last forming drum being processed associated with the relative carcass structure being processed, comprises transferring into the next station, according to the building cycle, said last forming drum being processed associated with the relative carcass structure being processed.

Indeed, the drums being processed which remain in the building line during the size change cycle can terminate the building, among other things according to the requirements of the building in second phase.

Preferably, said last forming drum being processed associated with the relative carcass structure being processed is sequentially moved between the successive building stations and the unloading station, according to the building cycle, and removed from the building line starting from the unloading station.

Preferably, all the forming drums being processed associated with the relative carcass structure being processed are sequentially moved between the successive building stations and the unloading station, according to the building cycle, and removed from the building line starting from the unloading station.

In this manner, the building of the carcass structure is complete on all the forming drums being processed.

Preferably, the entering forming drums are introduced in the building line in the stations sequentially left free by the forming drums being processed.

In this manner, it is not necessary to provide for additional hold positions.

Preferably, said size change cycle comprises sequentially transferring at said starting station all the entering forming drums introduced in the building line and dissociated from the carcass structure being processed.

In this manner, the start of a new building cycle is managed by being able to have all the entering forming drums already within the building station.

Preferably, provision is made for the enabling to restart a new building cycle when the last of the entering forming drums introduced in the building line and dissociated from the carcass structure being processed has been transferred into said starting station so that all the forming drums within the building line are considered forming drums being processed.

Preferably, said building cycle comprises sequentially moving said forming drums being processed between the n building stations and the unloading station, leaving at least one free station between the building stations and the unloading station, said free station being used in said size change cycle in order introduce, in the building line, the first entering forming drum.

It is thus possible to exploit the type of building cycle in order to prevent additional hold positions and thus limit the bulk.

Preferably, said building cycle comprises:
building an intermediate portion of the carcass structure being processed on a respective forming drum being processed at the starting station;
completing the intermediate portion of the carcass structure being processed by transferring the respective forming drum being processed from the starting station to the remaining building stations, making the carcass structure being processed available for the subsequent assembly with a crown structure by means of unloading from the respective forming drum being processed at the unloading station;
transferring the forming drum being processed dissociated from the carcass structure being processed to the starting station for building a subsequent carcass structure being processed;
wherein, in an operative moment in which the starting station is occupied by a forming drum being processed, from one to n−1 stations selected from among the remaining building stations and the unloading station are occupied by respective forming drums being processed.

Preferably, the transfer between the n building stations and the unloading station is achieved by moving the forming drum being processed along at least two trajectories that are intersected at one point.

In this manner, the available space is optimised, preventing the use of complex, heavy and costly handling devices.

Preferably, the starting station is configured for building one or more from among: a complex, a liner, an under-liner, anti-abrasive inserts, sidewall inserts, sidewalls, reinforcement inserts, a first carcass ply, a second carcass ply.

Preferably, a building station following the starting station is configured for forming beads.

Preferably, a building station following the starting station is configured for executing rolling operations.

Preferably, said unloading station is controlled by a station for the assembly of the carcass structure with a respective crown structure.

Preferably, said building cycle of the carcass structure comprises:
building an intermediate portion of the carcass structure on a respective forming drum being processed in a starting station of the building line;
completing the intermediate portion of the carcass structure by transferring the respective forming drum being processed between the starting station and the remaining building stations;
transferring, to the unloading station, the carcass structure being processed, wherein this is made available for the subsequent assembly with a respective crown structure by means of unloading from the respective forming drum being processed;
transferring the forming drum being processed once dissociated from said carcass structure being processed, from the unloading station to the starting station for building a subsequent carcass structure being processed.

Preferably, said size change cycle comprises removing, from the building line, a first forming drum being processed starting from the unloading station.

Preferably, said first forming drum being processed is removed from the building line, associated with a first support element being processed.

In this manner, it is possible to optimise and automate the size change cycle, in addition to limiting the bulk.

Preferably, said size change cycle comprises dissociating said first support element being processed from said last forming drum being processed and associating said first support element being processed with said first forming drum being processed in order to place them on hold in the unloading station.

In this manner, it is possible to prevent a manual management of the support elements both in the size change cycle and in the building cycle.

Preferably, said size change cycle comprises introducing, in said starting station, said first entering forming drum associated with a first entering support element.

Preferably, a second support element being processed is substituted with a second entering support element at said starting station.

In this manner, the size change cycle is also manually attained in the station which requires support elements.

Preferably, said size change cycle comprises transferring, according to the building cycle, a second of said forming drums being processed to the unloading station, by freeing the last of the building stations.

Preferably, in a building station following the starting station, according to the building cycle, the entering forming drum dissociated from the carcass structure being processed—previously introduced in the building line—is removed, said first entering forming drum is transferred from the starting station to said next building station, when all the entering forming drums have been introduced in the building line.

Preferably, said first entering forming drum follows said building cycle up to the unloading station. In this manner, the first carcass structure is completed according to the new size.

Preferably, said size change cycle comprises sequentially transferring in said starting station all the entering forming drums introduced in the building line and dissociated from the carcass structure being processed.

In this manner it is possible to quickly restart the building cycle.

Preferably, said size change cycle terminates when said last of the entering forming drums introduced in the building line and dissociated from the carcass structure being processed reaches the starting station.

Preferably, provision is made for a hold device configured for receiving said at least one group of entering forming drums, said hold device comprising at least one hold position configured for receiving an entering forming drum associated with a first entering support element.

In this manner, it is possible to optimise the spaces and the overall time of the size change cycle.

Preferably, said hold device is configured for receiving a plurality of groups of entering forming drums, each defining a different size of carcass structure being processed, said hold device comprising, for each group of entering forming drums, at least one hold position configured for receiving an entering forming drum associated with a first entering support element.

In this manner, it is possible to reduce the manual operation, leaving the operator free to carry out the operations for placing the plant in normal operating conditions, in case of size change cycle.

Preferably, said starting station comprises at least one or more from among:
a building device configured for supplying complex,
a building device configured for supplying liner,
a building device configured for supplying under-liner,
a building device configured for supplying anti-abrasive inserts,
a building device configured for supplying sidewall inserts,
a building device configured for supplying reinforcements,
a building device configured for supplying sidewalls,
a building device configured for supplying a first carcass ply,
a building device configured for supplying a second carcass ply.

Preferably, a building station following the starting station comprises, as building device, a bead formation device.

Preferably, a building station following the starting station comprises, as building device, a rolling device.

Preferably, said unloading station is controlled by a station for the assembly of the carcass structure with a respective crown structure.

Preferably, m is equal to n and is equal to 3.

Preferably, said hold device comprises a number of hold positions equal to 3 or to multiples of 3.

Preferably, said hold device comprises a number of hold positions equal to m.

In this manner, a free station of the building line is exploited for carrying out the size change cycle.

Preferably, said building device/devices is/are configured for supplying the relative component in the form of a semi-finished product.

BRIEF DESCRIPTION OF THE DRAWINGS

Further characteristics and advantages will be clearer from the detailed description of a preferred but not exclusive embodiment of a method for managing a carcass structure building line, a process and a plant for building tyre carcass structures, in accordance with the present invention.

Such description will be set forth hereinbelow with reference to the set of drawings, provided only as a non-limiting example, in which.

DETAILED DESCRIPTION OF THE INVENTION

Figure 1:
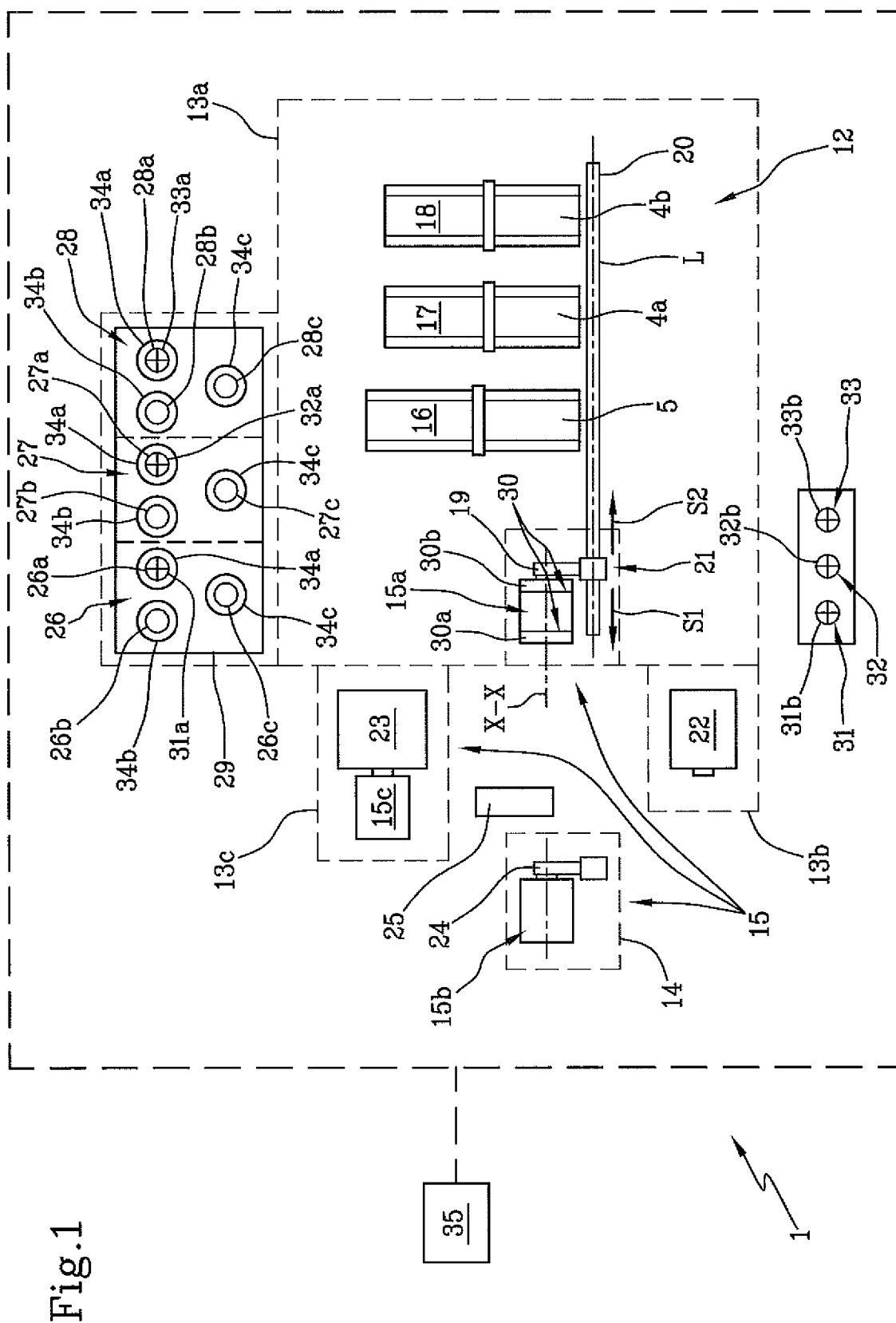
FIG. 1 schematically shows a plan view of a plant for building tyre carcass structures according to the present invention.

With reference to FIG. 1, reference number 1 overall indicates a plant for building tyre carcass structures in accordance with the present invention, hereinbelow indicated in brief as plant 1.

Figure 3:
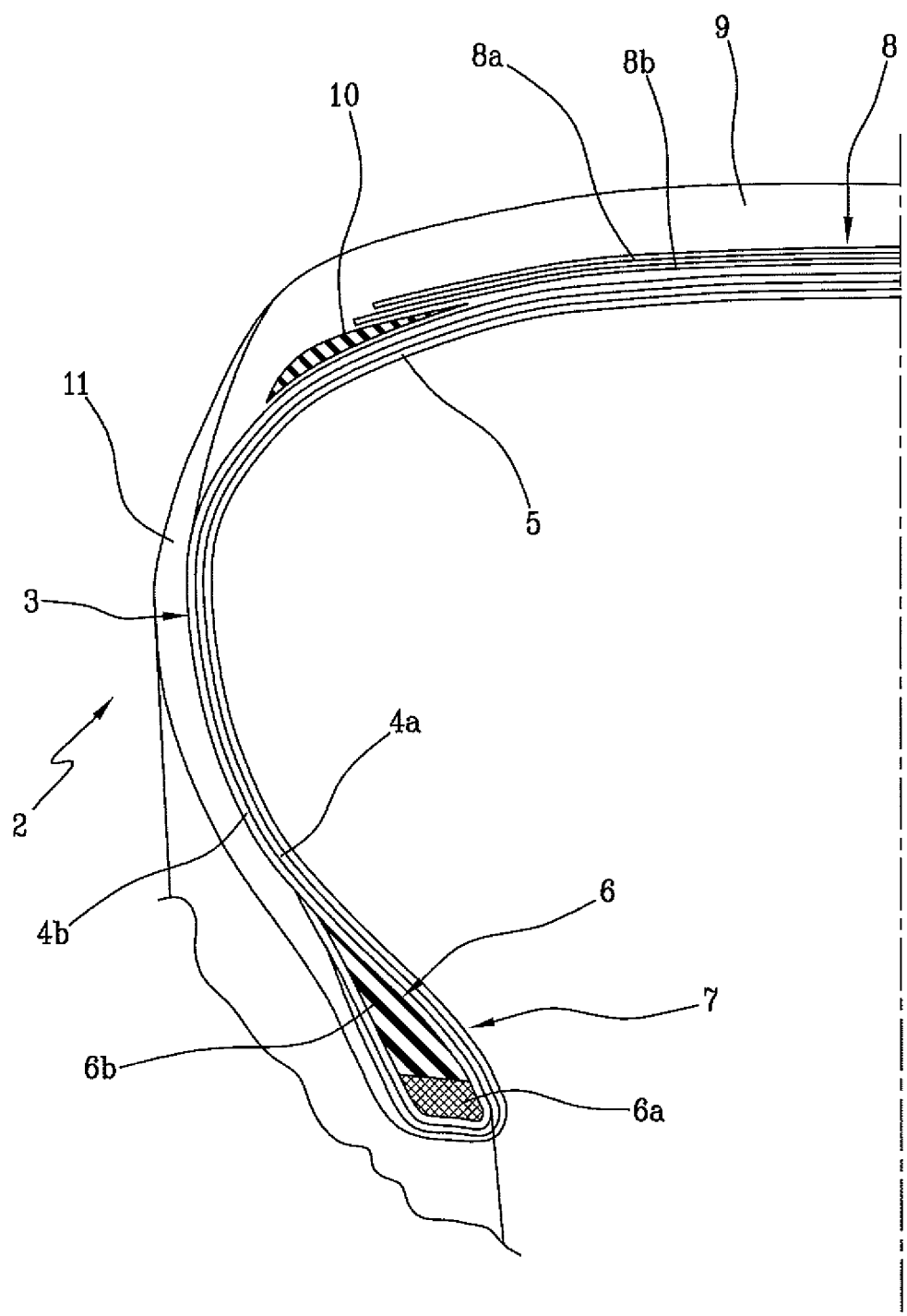
FIG. 3 shows a radial half-section of one embodiment of a tyre built with the plant of FIG. 1.

An embodiment of a tyre 2, attained in said plant and according to the process in accordance with the present invention, is illustrated in FIG. 3 and essentially comprises a carcass structure 3 having at least one carcass ply (two plies in FIG. 3) 4a, 4b. A layer of impermeable elastomeric material or so-called liner 5 is applied inside the carcass ply/plies 4a, 4b. Two anchoring annular structures 6, each comprising a so-called bead core 6a carrying an elastomeric filler 6b in radially external position, are engaged with respective end flaps of the carcass ply/plies 4a, 4b. The anchoring annular structures 6 are integrated in proximity to zones normally identified with the term "beads" 7, at which the engagement between the tyre 2 and a respective mounting rim usually occurs. A belt structure 8 comprising at least one belt layer (two layers in FIG. 3) 8a, 8b, is circumferentially applied around the carcass ply/plies 4a, 4b, and a tread band 9 is circumferentially superimposed on the belt structure 8.

The belt structure 8 can be associated with so-called "under-belt inserts" 10, each situated between the carcass ply/plies 4a, 4b and one of the axially opposite end edges of the belt structure 8. Two sidewalls 11, each extended from the corresponding bead 7 to a corresponding lateral edge of the tread band 9, are applied in laterally opposite positions on the carcass ply/plies 4a, 4b.

The belt structure 8, the tread band 9 and possibly at least one part of the sidewalls 11, define the so-called crown structure of the tyre.

In accordance with the embodiment illustrated in FIG. 1, the abovementioned components of the tyre 2 are made on one or more forming drums by moving said forming drums between different building stations each comprising one or more building devices adapted to form a carcass structure being processed.

With reference to FIG. 1, the plant 1 for building tyre carcass structures comprises a carcass structure building line 12, hereinbelow indicated in brief as "building line" 12.

The building line 12 comprises a plurality of stations including n building stations and an unloading station. Each building station comprises one or more building devices adapted to form a carcass structure being processed. According to the illustrated embodiment, the building line 12 comprises three building stations 13a-13c (n=3) and an unloading station 14 which will be described hereinbelow in the following present description.

The plant 1 also comprises a group of forming drums being processed 15 comprising m forming drums being processed, with $2 \leq m \leq n$. The forming drums being processed define a first size of carcass structure being processed.

Preferably m is equal to n and is equal to three. According to the illustrated embodiment, the plant 1 comprises three forming drums being processed 15a-15c (m=n; m=3).

Between the n building stations, with 13a a building starting station was indicated, hereinbelow indicated in brief as "starting station" 13a.

The starting station 13a is preferably configured for building an intermediate portion of the carcass structure being processed on a respective forming drum being processed. In the illustrated embodiment, the starting station 13a is configured for attaining an intermediate portion corresponding to a carcass sleeve comprising the carcass plies 4a, 4b and the liner 5.

The starting station 13a comprises one or more building devices. In the plant illustrated in the figures, the starting station 13a comprises a plurality of building devices, each adapted to make a component of the carcass structure being processed, in particular of the intermediate portion of the carcass structure. In general, the starting station 13a can comprise at least one or more from among the following:
a building device configured for supplying complex (a complex is a set of liner, under-liner and anti-abrasive elongated elements),
a building device configured for supplying liner,
a building device configured for supplying under-liner,
a building device configured for supplying anti-abrasive inserts,
a building device configured for supplying sidewall inserts,
a building device configured for supplying reinforcements,
a building device configured for supplying sidewalls,
a building device configured for supplying a first carcass ply,
a building device configured for supplying a second carcass ply.

Preferably the building device/devices in particular of the first station 13a is/are configured for supplying the respective component in the form of a semi-finished product.

According to that illustrated in the enclosed FIG. 1, the starting station 13a comprises three building devices 16, 17, 18: a first building device 16 configured for supplying the liner 5 in the form of a semi-finished product, a second building device 17 configured for supplying the first carcass ply 4a in the form of a semi-finished product and a third building device 18 configured for supplying the second carcass ply 4b in the form of a semi-finished product.

According to that illustrated in the enclosed FIG. 1, in the starting station 13a one forming drum at a time is moved between the aforesaid three building devices 16, 17 and 18.

Illustrated in FIG. 1 is a forming drum being processed, transported by a first shuttle 19 operating in the starting station 13a. Such forming drum being processed will be subsequently defined as a last forming drum being processed 15a.

According to the illustrated embodiment, the starting station 13a can comprise a guide 20 which is preferably extended rectilinear along a deposition line "L". A first shuttle 19 is capable of being moved on the guide 20, moved by a suitable non-illustrated motor along the guide itself and in both travel directions "S1", "S2". The first shuttle 19 is capable of supporting one forming drum being processed at a time and making it rotate around a rotation axis "X-X" coinciding with the longitudinal symmetry axis of the drum itself and with the rotation axis of the carcass structure being processed. In the illustrated embodiment, the forming drum being processed is projectingly carried by the first shuttle 19, which comprises a grip element capable of retaining or releasing a terminal end of a central shaft of the forming drum being processed.

At one of the terminal ends of the guide 20, a first transfer station 21 can be defined. In particular the starting station 13a comprises the first transfer station.

The first shuttle 19 is movable at least to the first transfer station 21 in order to make the forming drum being processed with the carcass structure being processed—preferably the intermediate portion of the carcass structure being processed—available for subsequent building stations.

The remaining n−1 building stations are building stations following the starting station, according to a building cycle which will be described hereinbelow in the present description. In particular the successive building stations are configured for completing the building of the carcass structure being processed, in particular of the intermediate portion of the carcass structure being processed. In the embodiment illustrated in the enclosed figures, two successive building stations 13b and 13c are provided, respectively comprising a building device for example selected between a bead formation device 22 and a rolling device 23. In particular the building station 13b immediately following the starting station 13a comprises the bead formation device 22 while the further successive building station 13c comprises the rolling device 23.

As stated above, the plant 1 also comprises the unloading station 14 controlled by a station for the assembly of the carcass structure with a respective crown structure. In particular, at the unloading station 14, the built carcass structure being processed is made available for the subsequent assembly with the crown structure by means of unloading from the respective forming drum being processed and subsequent transfer, for example to a shaping drum (not shown). The unloading station 14 can comprise a second shuttle 24.

A handling device has been indicated with 25. Preferably the handling device 25 is a handling device with three Cartesian axes and with a wrist rotation axis which allows the rotation of the forming drum being processed from horizontal axis to vertical axis and vice versa.

The plant 1 comprises at least one group of entering forming drums comprising m entering forming drums, defining a second size of carcass structure being processed. Multiple groups of entering forming drums can be provided, each defining a different size of carcass structure being processed.

In the embodiment illustrated in FIG. 1, three groups of entering forming drums 26, 27 and 28 are provided; each comprises three entering forming drums, respectively indicated 26a-26c, 27a-27c, 28a-28c respectively defining a second, third and fourth size of a carcass structure being processed. The entering forming drums are schematically illustrated in the enclosed figures.

With 29, a hold device has been indicated that is configured for receiving at least one group of entering forming drums, preferably a plurality of groups of entering forming drums. In the illustrated embodiment, the hold device 29 is configured for receiving three groups of entering forming drums 26, 27 and 28.

The plant 1 also comprises a pair of support elements being processed 30 comprising a first support element being processed 30a and a second support element being processed 30b. The first and the second support element being processed are suitable for the first size of carcass structure being processed.

The plant 1 also comprises at least one pair of entering support elements comprising a first entering support element and a second entering support element. In the embodiment illustrated in FIG. 1, three pairs of entering support elements 31, 32, 33 are provided, each comprising a first entering support element and a second entering support element respectively indicated 31a-31b, 32a-32b, 33a-33b and respectively suitable for the second, third and fourth size of carcass structure being processed. In the embodiment illustrated in FIG. 1, the first entering support element and the second entering support element of the three pairs of entering support elements 31, 32, 33 are arranged at different points of the plant 1, hence the relative reference numbers 31, 32, 33 are only indicated with reference to the respective second entering support element 31b, 32b, 33b. The first entering support element and the second entering support element are schematically illustrated in the enclosed figures.

The hold device 29 comprises a hold position for each entering forming drum, hence m hold positions for each group of entering forming drums. Preferably the hold device 29 comprises a number of hold positions equal to three or to multiples of three.

At least one hold position for each group of entering forming drums is configured for receiving an entering forming drum associated with a first entering support element. In the embodiment illustrated in FIG. 1, three hold positions 34a-34c are provided for each group of entering forming drums, including a hold position 34a for each group of entering forming drums 26-28 that is configured for receiving an entering forming drum 26a-28a associated with the respective first entering support element 31a-33a. The hold positions are schematically illustrated in the enclosed figures.

In a plant 1 as described above, it is possible to execute a process for building tyre carcass structures comprising a building cycle for building a carcass structure on a forming drum being processed and a size change cycle.

The building cycle comprises sequentially and cyclically moving between the n building stations 13a-13c and the unloading station 14 the aforesaid m forming drums being processed 15a-15c. In particular at least one (preferably only one) station from among the building stations 13a-13c and the unloading station 14 is left free. In other words, in an operative moment in which the starting station 13a is occupied by a forming drum being processed, from one to n−1 stations (preferably n−1) selected from among the remaining building stations and the unloading station are occupied by respective forming drums being processed.

At any one operative moment of the building cycle, only the unloading station 14 and the starting station 13a of the n building stations can comprise a forming drum being processed 15a-15c dissociated from the carcass structure being processed. Hereinbelow, an embodiment of a building cycle executed on the plant 1 of FIG. 1 is described in which, with reference to a single forming drum being processed 15a, provision is made for:
building an intermediate portion of the carcass structure being processed on a respective forming drum being processed 15a at the starting station 13a;
completing the intermediate portion of the carcass structure being processed by sequentially transferring the respective forming drum being processed 15a from the starting station 13a to the remaining building stations 13b, 13c,
making the carcass structure being processed available for the subsequent assembly with a crown structure by means of unloading from the respective forming drum being processed 15a at the unloading station 14;
transferring the forming drum being processed 15a dissociated from the carcass structure being processed to the starting station 13a for building a subsequent carcass structure being processed.

The aforesaid building cycle is repeated, staggered, for all the forming drums being processed 15a-15c which simultaneously occupy the building line 12, as stated above leaving at least one (preferably only one) station free between the unloading station and the building stations.

With reference to FIG. 1, three forming drums being processed have been illustrated. The intermediate portion of the carcass structure being processed is built on the last forming drum being processed 15a, arranged in the starting station 13a. A first forming drum being processed 15b is in the unloading station 14 dissociated from the relative carcass structure being processed. A second forming drum being processed 15c is in the building station 13c, where the rolling of the carcass structure being processed is carried out. At the end of the building of the intermediate portion of the carcass structure being processed, the last forming drum being processed 15a is transferred into the immediately following building station 13b for the formation of the beads. Subsequently the first forming drum being processed 15b is transferred from the unloading station 14 to the starting station 13a for building an intermediate portion of the carcass structure being processed. Subsequently the second forming drum being processed 15c is transferred from the building station 13c to the unloading station 14. In order to terminate the movement of the forming drums being processed and be situated in a situation similar to that of FIG. 1, but offset by a position, the last forming drum being processed 15a is transferred into the immediately successive building station 13c for the rolling. In order to be situated in a situation equivalent to that of FIG. 1, the forming drums being processed 15a-15c are each time transferred into the immediately successive free station until the last forming drum being processed 15a once again arrives in the starting station 13a.

Hereinbelow, an embodiment of a size change cycle executed on the plant 1 of FIG. 1 will be described, starting from the configuration illustrated in FIGS. 1 and 2a. FIG. 2a represents the plant of FIG. 1 further schematized and simplified, for example by providing for only one group of entering forming drums 26 and only one pair 31 of entering support elements. That described hereinbelow can be applied to any group of entering forming drums 26-28, selected as a function of the new size, or to different pairs of entering support elements, selected as a function of the width interval or of the diameter of the new size.

The size change cycle described below refers to the situation in which it is requested to change both the forming drums being processed and the pair of support elements being processed. In particular the size change cycle described below provides for substituting the first and second support element being processed respectively with a first and a second entering support element. The first entering support element is associated with one of the m entering forming drums.

According to the size change cycle, provision is made for removing, from the starting station 13a, the last forming drum being processed 15a associated with the relative carcass structure being processed. In particular the last forming drum being processed 15a is removed from the starting station 13a, when the intermediate portion of the carcass structure being processed is terminated. Once the last forming drum being processed 15a is removed from the starting station 13a, the size change cycle provides for introducing a first entering forming drum at the starting station 13a. With reference to FIG. 2a and following figures, the first entering forming drum is indicated with 26a.

In order to remove the last forming drum being processed 15a from the starting station 13a, provision is made for following the building cycle, in a manner so as to complete the carcass structure being processed, then transferring the last forming drum being processed 15a into the subsequent building station 13b. According to the illustrated embodiment, the last forming drum being processed 15a is transferred into the building station 13b for the forming of the beads. The transfer of the last forming drum being processed 15a is carried out by the handling device 25, which picks up the last forming drum being processed 15a at the starting station 13a together with the first support element being processed 30a. This passage can occur by means of transfer of the first shuttle 19 towards the handling device 25 as illustrated in FIG. 2a (arrow A) or vice versa, by maintaining the first shuttle 19 within the starting station 13a.

Figure 2B:
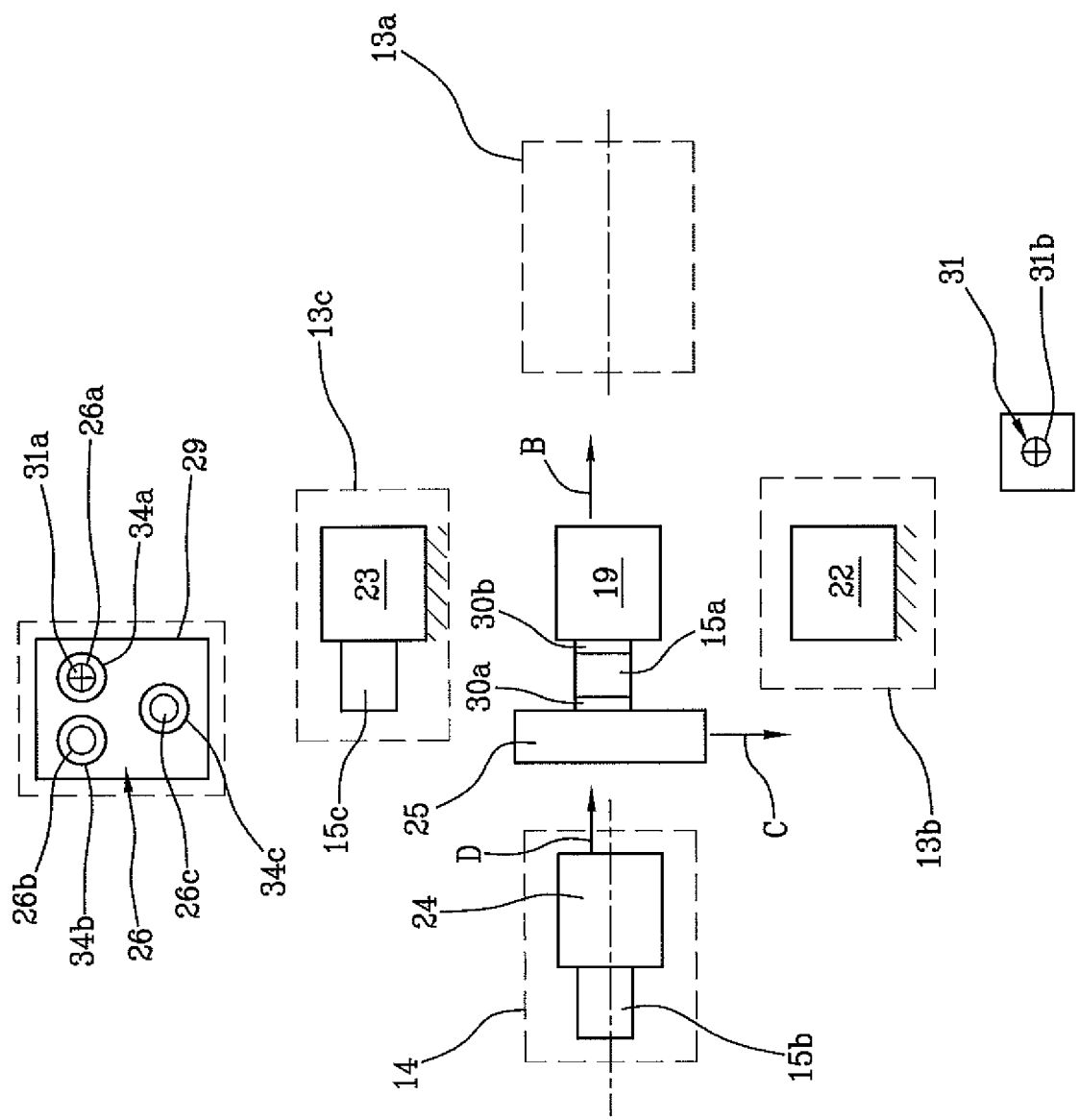
FIGS. 2a-2o are views of a portion of the plant of FIG. 1 in different operative moments.

FIG. 2b illustrates the moment in which the handling device 25 has gripped the last forming drum being processed 15a from the starting station 13a together with the first support element being processed 30a. In this case, the first shuttle 19 is moved towards the handling device 25. The second support element being processed 30b remains associated with the starting station 13a (except for the possible movement of the first shuttle 19 towards the handling device 25). The first shuttle 19 can return to the starting station 13a according to the arrow B, attaining the configuration of FIG. 2c (or vice versa the handling device 25 can be removed from the first shuttle 19). The handling device 25 is directed, according to the arrow C, towards the building station 13b with the last forming drum being processed 15a on board together with the first support element being processed 30a, attaining the configuration of FIG. 2c. The second shuttle 24 has the first forming drum being processed 15b on board. The first forming drum being processed 15b is already dissociated from the carcass structure. The second shuttle 24 can be directed, according to the arrow D, into a position adapted for interacting with the handling device, or it waits for the arrival of the handling device 25 in the unloading station 14.

FIG. 2c illustrates the moment in which the handling device 25 leaves the last forming drum being processed 15a in the building station 13b, retaining the first support element being processed 30a on board, and the handling device 25 is moved away according to the arrow E. In this moment, the size change cycle then provides for dissociating the first support element being processed 30a from the last forming drum being processed 15a. If the second shuttle 24 is moved according to the arrow D, it has now reached, together with the first forming drum being processed 15b, the position adapted for interacting with the handling device 25. Alternatively, the second shuttle 24 remains in the unloading station 14, waiting for the handling device 25.

FIG. 2d illustrates the moment in which the handling device 25 with the first support element being processed 30a has reached the second shuttle 24 and the first forming drum being processed 15b. In FIG. 2d, provision is made such that the second shuttle 24 is moved towards the handling device. Alternatively, the handling device 25 reaches the second shuttle 24 within the unloading station 14. When the handling device 25 has reached the second shuttle 24, it releases the first support element being processed 30a, associating it with the first forming drum being processed 15b. At this moment, the size change cycle then provides for associating the first support element being processed 30a with the first forming drum being processed 15b in order to place them on hold in the unloading station 14. As will be described hereinbelow, the first forming drum being processed 15b associated with the relative first support element being processed 30a will be subsequently removed from the building line 12 starting from the unloading station 14.

In FIG. 2e, the handling device 25 is free to pick up the first entering forming drum 26a, being moved according to the arrow F. If the second shuttle 24 is moved according to the arrow D, it now returns in the unloading station 14 according to the arrow G, together with the first forming drum being processed 15b and the first support element being processed 30a. Alternatively, the second shuttle 24 always remains in the unloading station 14. In each case, the first support element being processed 30a is placed on hold in the unloading station 14 with the first forming drum being processed 15b.

Figure 2F:
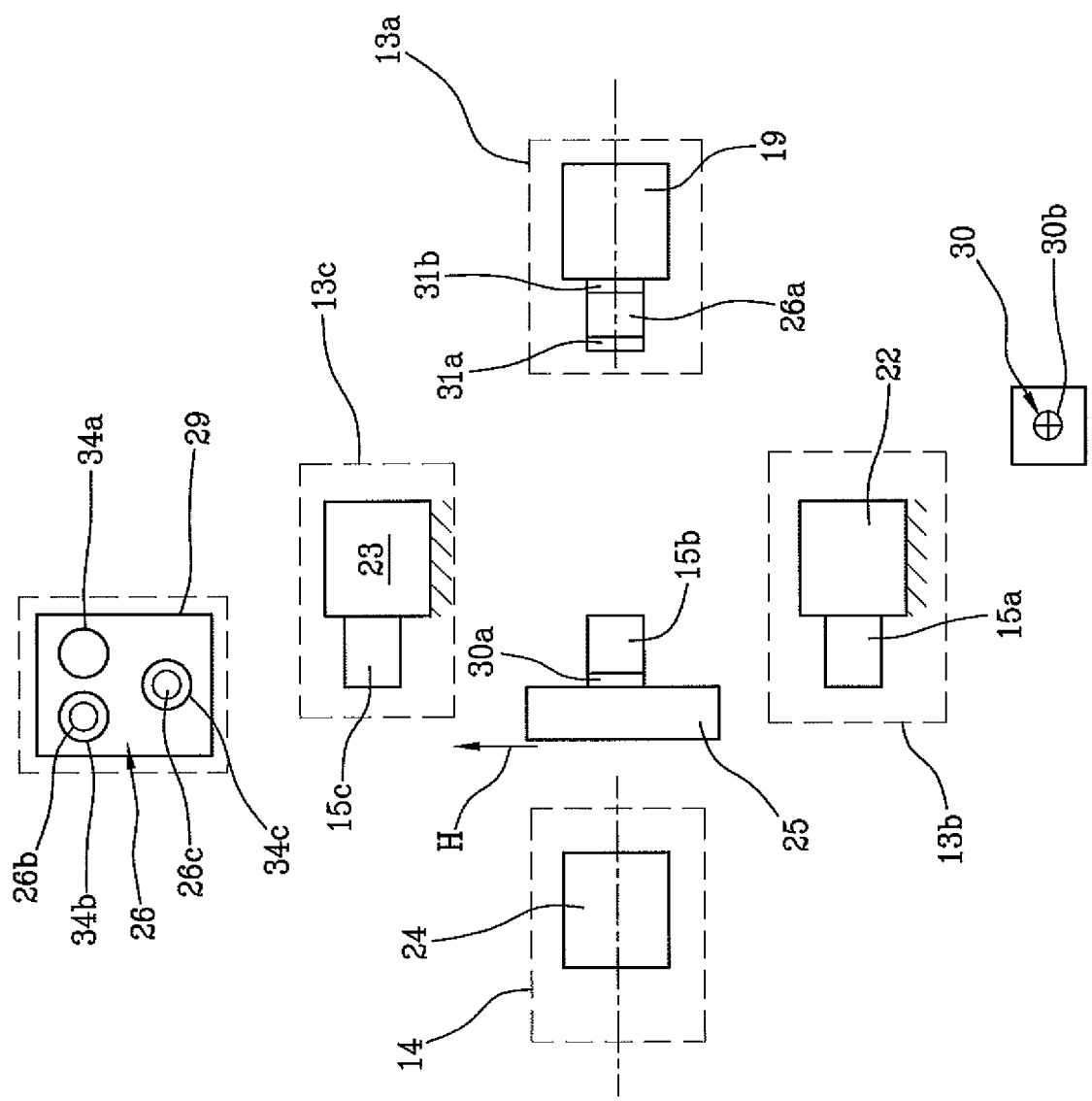

In FIG. 2f, the handling device 25 has picked up the first entering forming drum 26a together with the first entering support element 31a and it has released them on the first shuttle 19 in order to be introduced in the starting station 13a. In this moment, the size change cycle provides for introducing, at the starting station 13a, the first entering forming drum 26a associated with the first entering support element 31a. The handling device 25 can reach the first shuttle 19 directly in the starting station 13a or in a different position, for example reached by the first shuttle 19 following a movement not illustrated in the enclosed figures.

In any one of the situations of FIGS. 2c-2e, the second support element being processed 30b is substituted at the starting station 13a with the second entering support element 31b in order to reach the configuration of FIG. 2f. The second support element being processed 30b can be dissociated from the first shuttle 19 and the second entering support element 31b can be associated with the first shuttle 19 directly in the starting station 13a or outside the latter. In any case, at the moment in which the first shuttle 19 returns within the starting station 13a the size change cycle provides for substituting the second support element being processed 30b with the second entering support element 31b at the starting station 13a. With reference to the above-described actions, the size change cycle comprises substituting the second support element being processed 30b with the second entering support element 31b at one of the building stations and introducing, in the building line, the first entering support element 31a associated with the respective entering forming drum 26a at the same building station, in particular at the starting station 13a.

Subsequently the handling device 25 reaches the first forming drum being processed 15b and the first support element being processed 30a and picks them up from the second shuttle 24. The handling device 25 can reach the second shuttle 24 directly in the unloading station 14 or in a different position, for example reached by the second shuttle 24 following a movement not illustrated in the enclosed figures. Subsequently the handling device 25 removes, from the building line 12, the first forming drum being processed 15b and the first support element being processed 30a, releasing them on the hold device 29. Such removal then occurs starting from the unloading station 14. In FIG. 2f, the first forming drum being processed 15b and the first support element being processed 30a already associated with the handling device 25 are removed by following the arrow H.

From this operative moment of the size change cycle, the first entering forming drum 26a is maintained in the starting station 13a while the remaining entering forming drums 26b and 26c are sequentially introduced in the building line 12.

All the forming drums being processed starting from the first forming drum being processed 15b are sequentially removed from the building line 12.

In particular the size change cycle provides for driving the building device(s) of the starting station 13a simultaneously with sequential introduction of the remaining entering forming drums 26b and 26c. It is then possible to start the building of a new size of carcass structure being processed, by executing the necessary operations of adaptation and placing in operating conditions of the new components.

In particular the size change cycle provides for introducing each entering forming drum 26a-26c in the building line 12 at a building station different from those in which the remaining entering forming drums are introduced.

In particular, the entering forming drums 26a-26c are introduced in the building line 12 at the building stations sequentially left free by the forming drums being processed 15a-15c.

In addition, the size change cycle provides that all the forming drums being processed 15a-15c are sequentially moved between the building stations 13a-13c and the unloading station 14, according to the building cycle, hence completing the relative carcass structure being processed, in order to then be removed from the building line 12 starting from the unloading station 14.

Figure 2G:
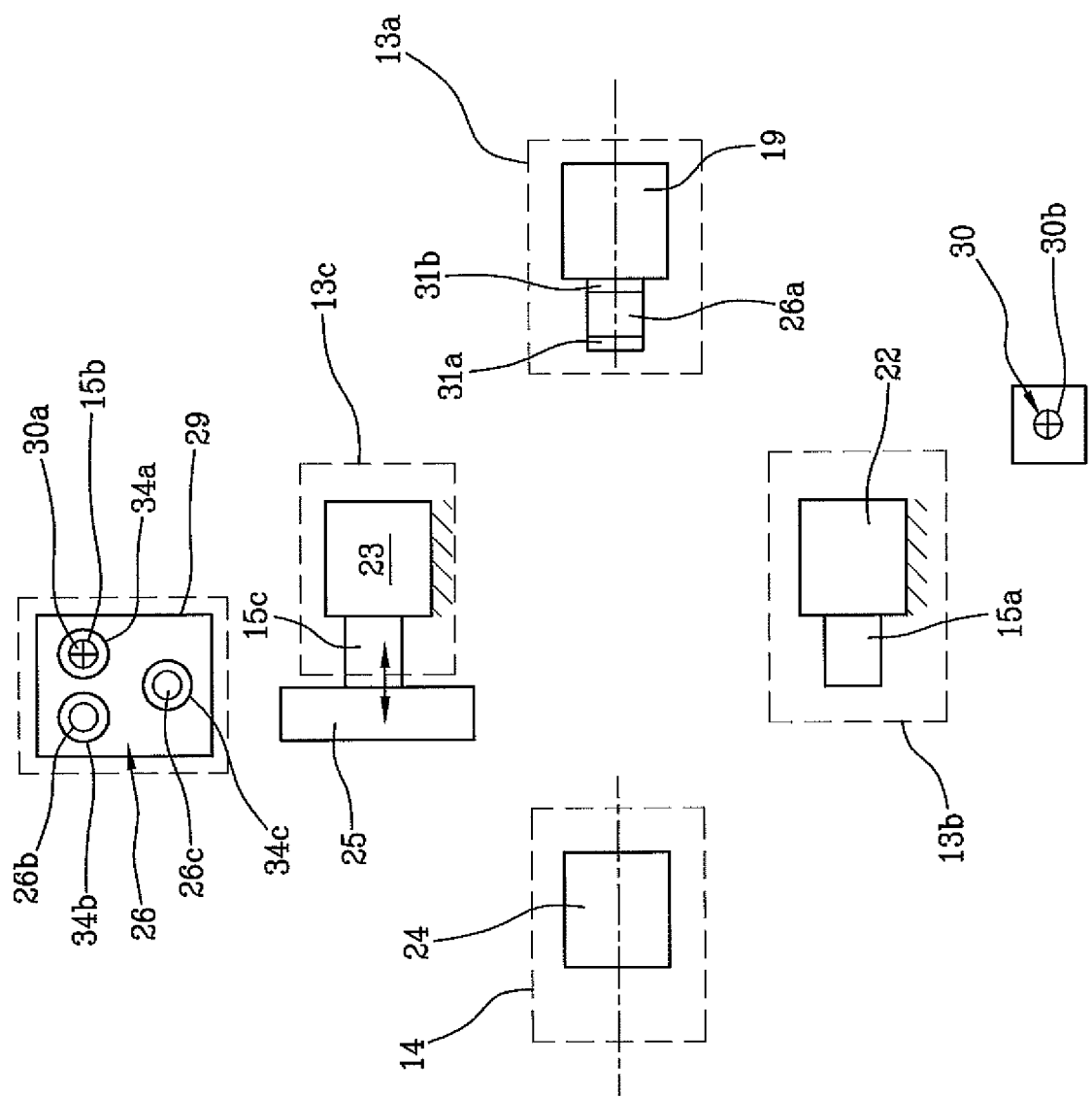

In particular the size change cycle provides for transferring, according to the building cycle, the second forming drum being processed 15c to the unloading station 14, freeing the last of the building stations 13c. With reference to FIG. 2g, the handling device 25 has left the first forming drum being processed 15b and the first support element being processed 30a on the hold device 29. The second forming drum being processed 15c is picked up by the handling device 25 in order to be transferred to the unloading station 14. The handling device 25 can reach the second shuttle 24 directly in the unloading station 14 or in a different position, for example reached by the second shuttle 24 following a movement not illustrated in the enclosed figures.

As will be described hereinbelow, subsequently the last forming drum being processed 15a will be sequentially moved between the successive building stations 13c and the unloading station 14, following the building cycle, in a manner so as to complete the carcass structure being processed associated therewith. In particular, after the building station 13b where the bead forming is executed, the last forming drum being processed 15a is transferred to the subsequent building station 13c for the rolling. With reference to FIG. 2h, the second forming drum being processed 15c has reached the unloading station 14. The carcass structure being processed is dissociated from the second forming drum being processed 15c. The last forming drum being processed 15a is picked up by the handling device 25 in order to be transferred into the rolling station i.e. into the subsequent building station 13c according to the building cycle.

Subsequently the handling device 25 picks up a second of the remaining entering forming drums 26b and releases it in the building station 13b left free. With reference to FIG. 2i, the last forming drum being processed 15a has reached the rolling station, the handling device 25 has picked up the second of the remaining entering forming drums 26b and is releasing it in the bead formation station. In this operative moment of the size change cycle, the bead formation station defines a building station different from the starting station 13a comprising an entering forming drum 26b dissociated from the carcass structure being processed. In particular the size change cycle provides for substituting the forming drums being processed one at a time with the entering forming drums by using a movement sequence between the building stations that is at least partially different from that provided in the building cycle. Indeed the first entering forming drum 26a remains in the starting station 13a and the second entering forming drum 26b dissociated from the carcass structure being processed is introduced in a next building station, in particular in the immediately subsequent building station.

Subsequently the handling device 25 picks up the second forming drum being processed 15c from the unloading station 14 dissociated from the carcass structure and removes it from the building line 12, releasing it on the hold device 29.

Then, the handling device 25 picks up the last forming drum being processed 15a from the last building station 13c, for example corresponding to the rolling station and transfers it to the unloading station 14. In both cases, the handling device 25 can reach the second shuttle 24 directly in the unloading station 14 or in a different position, e.g. reached by the second shuttle 24 following a movement not illustrated in the enclosed figures. With reference to FIG. 2I, the handling device 25 has picked up the second forming drum being processed 15c from the unloading station 14, it has released it on the hold device 29 and is picking up the last forming drum being processed 15a from the last building station 13c, e.g. corresponding to the rolling station in order to transfer it to the unloading station 14.

Figure 2M:
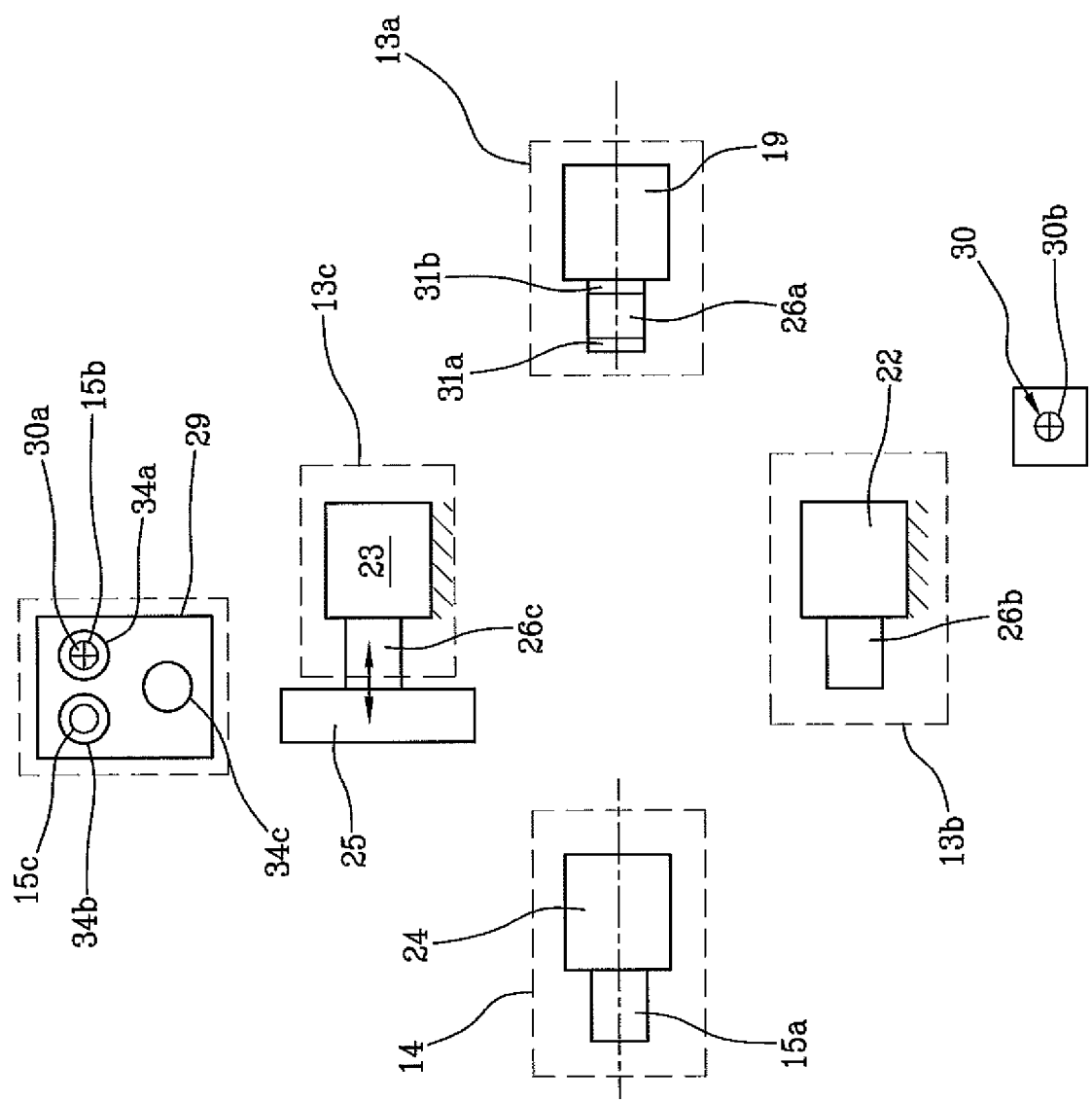

Subsequently the handling device 25 picks up the last entering forming drum 26c from the hold device 29 and transfers it into the forming station 13c. With reference to FIG. 2m, the handling device 25 has released the last forming drum being processed 15a at the unloading station 14, it has picked up the last entering forming drum 26c from the hold device and is releasing it in the last building station 13c. Meanwhile the carcass structure being processed is dissociated from the last forming drum being processed 15a at the unloading station 14.

Subsequently the handling device 25 picks up the last forming drum being processed 15a from the unloading station 14 dissociated from the carcass structure and removes it from the building line 12 in order to release it on the hold device 29. Subsequently the handling device 25 picks up the second entering forming drum 26b from the bead formation station 13b in order to transfer it into the unloading station 14. With reference to FIG. 2n, the handling device 25 has picked up the last forming drum being processed 15a from the unloading station 14, it has released it on the hold device 29, it has picked up the second entering forming drum 26b from the bead formation station 13b and it has transferred it to the unloading station 14. The handling device 25 can reach the second shuttle 24 directly in the unloading station 14 or in a different position, e.g. reached by the second shuttle 24 following a movement not illustrated in the enclosed figures.

In this operative moment of the size change cycle, all the entering forming drums have been introduced in the building line and the first entering forming drum 26a is then transferred from the starting station 13a to the next station 13b, according to the building cycle. In particular, the second entering forming drum 26b dissociated from the carcass structure being processed, previously introduced in the building line, is removed from the station 13b following the starting station 13a, according to the building cycle. The first entering forming drum 26a will follow the building cycle up to the unloading station 14.

Subsequently the size change cycle provides for sequentially transferring, to the starting station 13a, all the entering forming drums 26b, 26c introduced in the building line and dissociated from the carcass structure being processed. From the starting station 13a, all the entering forming drums 26b, 26c introduced in the building line will follow the building cycle up to the unloading station 14.

The size change cycle terminates when the last of the entering forming drums 26c introduced in the building line and dissociated from the carcass structure being processed reaches the starting station 13a (FIG. 20).

If each size corresponds with a pair of support elements being processed, the above-described size change cycle is applied each time it is necessary to change size. If support elements being processed are provided with variable positioning (width), i.e. capable of being adapted to the positioning (width) of the drum, the above-described size change cycle is only applied when it is necessary to change the positioning interval or if the fitting (diameter) of the forming drums is changed. In the other cases, the support elements being processed are not substituted and one only proceeds with the substitution of the forming drum. In this case, the hold device 29 only has entering forming drums, not associated with support elements. The size change cycle is therefore analogous to that described above, with the difference that the first support element being processed 30a is placed on hold on the second shuttle 24, in particular at the unloading station 14, and not substituted. Analogously the second support element being processed 30b remains on the first shuttle 19, in particular at the starting station 13a, and is not substituted.

In light of the above-described process, in accordance with a method for managing the carcass structure building line 12, provision is made for selecting between the building cycle and the size change cycle. At the end of the size change cycle, i.e. when the last of the entering forming drums 26c introduced in the building line 12 and dissociated from the carcass structure being processed has been transferred to the starting station 13a, the method for managing the carcass structure building line 12 comprises the enabling to restart a new building cycle. From this moment, all the forming drums in the building line 12 are considered forming drums being processed.

During the building cycle and/or during the size change cycle, the transfer between the n building stations 13a-13c and the unloading station 14 can be attained by moving the forming drum being processed along at least two trajectories that are intersected at one point, e.g. by means of the movement of the first shuttle 19, of the second shuttle 24 and of the handling device 25. Alternatively, the only transport device of the plant 1 can be constituted by the handling device 25.

In light of the management of the building line 12, the plant 1 also comprises a control unit 35 programmed for attaining the building cycle and the size change cycle. In particular the control unit 35 is programmed for:
transferring the last forming drum being processed 15a associated with the relative carcass structure being processed from the starting station 13a to the subsequent building station 13b according to a building cycle, introducing at the starting station 13a the first of the m entering forming drums 26a,
while maintaining the first entering forming drum 26a at the starting station 13a, sequentially introducing the remaining entering forming drums 26b-26c in the building line 12 and sequentially removing the remaining forming drums being processed 26b-26c from the building line 12.

The invention claimed is:

1. A process for building tyre carcass structures comprising:
executing a building cycle for building a carcass structure on a forming drum being processed in a carcass structure building line comprising a plurality of stations comprising an unloading station for unloading a built carcass structure and n building stations, each comprising one or more building devices adapted to form a carcass structure being processed, said building cycle being repeated for m forming drums being processed, wherein $2 \leq m \leq n$, which simultaneously occupy the building line, leaving at least one station free among the unloading station and the n building stations, said process for building carcass structures comprising a size change cycle which comprises:
transferring a last forming drum being processed associated with a relative carcass structure being processed from a starting building station to a subsequent building station during said building cycle;
introducing, in said starting building station, a first of m entering forming drums; and
while maintaining said first of m entering forming drums at the starting building station, sequentially introducing at the plurality of stations other than the starting building station in the building line the remaining entering forming drums and sequentially removing from the building line forming drums being processed.

2. The process for building tyre carcass structures as claimed in claim 1, wherein said building cycle of the carcass structure comprises:
building an intermediate portion of a carcass structure on a respective forming drum being processed in the starting building station of the building line;
completing the intermediate portion of the carcass structure by transferring the respective forming drum being processed between the starting building station and the remaining building stations;
transferring, to the unloading station, the carcass structure being processed wherein said carcass structure being processed is made available for a subsequent assembly with a respective crown structure by unloading the carcass structure being processed from the respective forming drum being processed; and
transferring the forming drum being processed, once dissociated from said carcass structure being processed, from the unloading station to the starting building station for building a subsequent carcass structure being processed.

3. The process for building tyre carcass structures as claimed in claim 1, wherein said size change cycle comprises removing from the building line a first forming drum being processed, starting from the unloading station.

4. The process for building tyre carcass structures as claimed in claim 3, wherein said first forming drum being processed is removed from the building line, associated with a first support element being processed.

5. The process for building tyre carcass structures as claimed in claim 4, wherein said size change cycle comprises dissociating a first support element being processed from said last forming drum being processed and associating said first support element being processed with said first forming drum being processed in order to place the first support element and the first forming drum being processed on hold in the unloading station.

6. The process for building tyre carcass structures as claimed in claim 4, wherein said size change cycle comprises introducing, in said starting building station, said first entering forming drum associated with a first entering support element.

7. The process for building tyre carcass structures as claimed in claim 4, wherein a second support element being processed is substituted with a second entering support element at said starting building station.

8. The process for building tyre carcass structures as claimed in claim 1, wherein said size change cycle comprises driving the one or more building devices of the starting building station simultaneously with the sequential introduction of remaining entering forming drums.

9. The process for building tyre carcass structures as claimed in claim 2, wherein said size change cycle comprises transferring, according to the building cycle, a second forming drum being processed to the unloading station, freeing a last station of the building stations.

10. The process for building tyre carcass structures as claimed in claim 9, wherein all forming drums being processed associated with a relative carcass structure being processed are sequentially moved between successive building stations and the unloading station, according to the building cycle, and removed from the building line starting from the unloading station.

11. The process for building tyre carcass structures as claimed in claim 9, wherein said last forming drum being processed associated with a relative carcass structure being processed, is sequentially moved between successive building stations and the unloading station, according to the building cycle, and removed from the building line starting from the unloading station.

12. The process for building tyre carcass structures as claimed in claim 9, wherein entering forming drums are introduced in the building line in stations left sequentially free by forming drums being processed.

13. The process for building tyre carcass structures as claimed in claim 12, wherein from one building station following the starting building station, according to the building cycle, an entering forming drum dissociated from the carcass structure being processed, already introduced in the building line, is removed and said first entering forming drum is transferred from the starting building station to said subsequent building station, when all the entering forming drums have been introduced in the building line.

14. The process for building tyre carcass structures as claimed in claim 13, wherein said first entering forming drum follows said building cycle up to an unloading station.

15. The process for building tyre carcass structures as claimed in claim 13, wherein said size change cycle comprises sequentially transferring, into said starting building station, all the entering forming drums introduced in the building line and dissociated from a carcass structure being processed.

16. The process for building tyre carcass structures as claimed in claim 15, wherein said size change cycle terminates when a last drum of the entering forming drums introduced in the building line and dissociated from the carcass structure being processed reaches the starting building station.

* * * * *